United States Patent
Manico et al.

(10) Patent No.: US 7,772,802 B2
(45) Date of Patent: Aug. 10, 2010

(54) CHARGING DISPLAY SYSTEM

(75) Inventors: Joseph A. Manico, Rochester, NY (US);
Joel S. Lawther, Pittsford, NY (US);
Michael J. Telek, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 623 days.

(21) Appl. No.: 11/738,619

(22) Filed: Apr. 23, 2007

(65) Prior Publication Data
US 2008/0258679 A1 Oct. 23, 2008

Related U.S. Application Data

(63) Continuation-in-part of application No. 11/680,689, filed on Mar. 1, 2007.

(51) Int. Cl.
*H02J 7/00* (2006.01)
(52) U.S. Cl. .................................. 320/108; 320/106
(58) Field of Classification Search ................. 320/101, 320/106, 107, 108
See application file for complete search history.

(56) References Cited

U.S. PATENT DOCUMENTS

| | | | |
|---|---|---|---|
| 3,840,795 | A | 10/1974 | Roszyk et al. |
| 4,558,757 | A | 12/1985 | Mori et al. |
| 5,541,372 | A | 7/1996 | Baller et al. |
| 5,959,433 | A | 9/1999 | Rolide |
| 6,707,274 | B1 | 3/2004 | Karr |
| 6,984,039 | B2 | 1/2006 | Agostinelli |
| 7,079,722 | B2 | 7/2006 | Mahbobi |
| 2004/0056779 | A1* | 3/2004 | Rast ............................ 340/985 |
| 2004/0066169 | A1* | 4/2004 | Bruning ....................... 320/108 |
| 2006/0158152 | A1 | 7/2006 | Taniguchi et al. |
| 2006/0176015 | A1 | 8/2006 | Bersenev |
| 2008/0126927 | A1* | 5/2008 | Jha ............................. 715/700 |
| 2008/0211458 | A1* | 9/2008 | Lawther et al. ............. 320/132 |

FOREIGN PATENT DOCUMENTS

WO 2006/033736 3/2006

OTHER PUBLICATIONS

Touch International, "Fire is No Match for Touch Guy", www.touchinternational.com.

(Continued)

*Primary Examiner*—Edward Tso
*Assistant Examiner*—M'Baye Diao
(74) *Attorney, Agent, or Firm*—Roland R. Schindler

(57) ABSTRACT

A charging display system and method for operating a display system are provided with the method comprising sensing the presence of a wirelessly rechargeable device proximate to or on a surface through which a presentation area of a display can present image information; identifying a type of the wirelessly rechargeable device; obtaining device representation having features that are related to a portion of the presentation area that can be occupied by the presence of the identified type of rechargeable device; determining a position and orientation of the rechargeable device proximate to or on the surface; and segmenting the presentation area into a wirelessly rechargeable device portion and a graphic presentation portion outside of the determined of the rechargeable device portion. A wireless power signal is transmitted through the rechargeable device portion and graphic information related to the rechargeable device is displayed in the graphic presentation portion.

20 Claims, 15 Drawing Sheets

OTHER PUBLICATIONS

Splashpad™ by Splashpower Ltd., Cambridge, United Kingdom, www.splashpower.com/products.

Fulton Innovation LLC, "The Big Story for CES 2007: The Public Debut of ECoupled Intelligent Wireless Power", www.ecoupled.com.

"Touchscreen", www.en.wikipedia.org/wiki/touchscreen.

WildCharge Inc., "WildCharge", www.wildcharge.com.

Editorials, "Wild Charger Does Charge Wirelessly", www.mytreo.net/archives/2007/02.

* cited by examiner

CHARGING DISPLAY SYSTEM

CROSS REFERENCE TO RELATED APPLICATIONS

This is a continuation-in-part of U.S. application Ser. No. 11/680,689 filed Mar. 1, 2007.

FIELD OF THE INVENTION

The invention relates to charging systems that charge rechargeable devices.

BACKGROUND OF THE INVENTION

A continuing trend in consumer electronic devices such as portable music players, cellular phones, computers, cameras, key chains with storage memory and the like is reduced size. Largely, this trend has been made possible through advances in the miniaturization of the electronic components of such devices. This trend has led, for example, to the creation of consumer electronic devices that are scaled on the order of a few centimeters. Such small-scale devices enable consumers to carry a vast array of electronic capabilities with them.

Unfortunately, battery and other energy storage technologies have not kept pace with this miniaturization trend. Accordingly, as the size of the device has been reduced, smaller batteries are being incorporated into such portable consumer electronic devices. This means that such devices require more frequent recharging and that such devices often require recharging on a daily basis.

It will be appreciated that user convenience is an important feature in the success of consumer products. People have little time or coordination for finding the small connectors to charge these tiny consumer electronic devices and sorting through multiple connectors and chargers to find the right one for a given device and then walk them to a PC for connecting. Further, people often distribute chargers for different devices throughout the home and in places that are related to the usage of the device. For example, a typical charger for a cellular phone can be located in a kitchen or on a dresser, while a charger for a picture-viewing device, video viewing device, a portable music device, or personal digital assistant may be in the family room or den in close proximity to a personal computer. It is often inconvenient to distribute such portable consumer electronic devices for charging each day and to collect such devices when it is time to leave the home.

Moreover, it will be appreciated that user interface technology has also adjusted to this trend in that some small-scale devices have incorporated proportionately smaller displays and smaller user controls. This makes it increasingly difficult to present all of the status information regarding the electronic device on such smaller displays at one time. For example, consumers typically need to know when an electronic device is working, is interacting with a charger such as by being charged or routing data to and/or from the device. A wide variety of indicators, such as status icons, can be used to present such information to a user. As displays get smaller, the size of the indicators must get smaller. However, the ability of people to read indicators and other forms of information presented by a display has remained effectively fixed. Accordingly, manufacturers have typically elected to reduce the number of indicators presented on the display at one time. This prevents a user from determining the status of the device with a single glance as is desired by the user. In addition, when charging multiple devices simultaneously, the status of individual units must be individually checked.

Further, the average size of a person's fingers and the average dexterity in the use of a person's fingers has not improved in concert with the miniaturization of controls on such devices. This leads to frustration during the operation of the device. The devices mentioned have also gained a great deal of memory storage capacity in the forms of miniaturized Hard Drives and high capacity removable memory cards. With this new capacity, small portable devices such as cameras, music players, and personal media players can hold literally thousands of songs and photographs and hundreds of hours of video. Navigating, scrolling through, or selecting individual media elements from this amount of content is a daunting task when provided with only a tiny screen and limited user interface.

Accordingly, many small consumer electronic devices to simply omit display technology from the device and/or to reduce the number of controls incorporated therein. Either of these trends makes such consumer electronic devices more difficult to interact with. To attempt to solve this problem, docking stations are provided for such devices that have connectors that establish communication and power transfer links between the electronic device and a separate terminal, such as a personal computer. This allows the users of such devices to interact with the electronic device by way of a separate terminal, such as a personal computer, while also recharging the battery of the device.

If a docking system is used, it is typically designed to interface with a single type and model of device. Some docking systems such as the EASYSHARE Camera Dock 6000, are provided with mechanical and electro-mechanical adapters to accommodate a limited set of compatible camera models. With this approach the user has to locate the appropriate adapter and use it to configure the dock in order to charge the designated camera and interface it with a personal computer. For multiple devices, multiple docks would be required adding to the number of cables, reducing the number of available communications ports, and reducing the amount of available table or desk surface.

Further, if a compact electronic device is configured for charging and synchronization with a particular computer, and that computer is in use by another user, even wireless data transfer would have to wait until the computer was available. With a wireless charger the user would have to wait until the compact electronic device was sufficiently charged for the device display to function, in order to interface with the unit.

What is needed is a new approach that is capable of charging any of a plurality of devices from a central location, and that also enables consumers to better interact with small scale devices without requiring proximity to a personal computer.

SUMMARY OF THE INVENTION

A charging display system and method for operating a display system are provided with the method comprising the steps of sensing the presence of a wirelessly rechargeable device proximate to or on a surface through which a presentation area of a display can present image information; identifying a type of the wirelessly rechargeable device; obtaining a device representation having features that are related to a portion of the presentation area that can be occupied by the presence of the identified type of rechargeable device proximate to or on the surface; determining a location and orientation of the rechargeable device proximate to or on the surface; and segmenting the presentation area into a wirelessly rechargeable device portion determined by mapping the obtained device representation at the determined location and orientation and a graphic presentation portion outside of the determined of the rechargeable device portion. A wireless power signal is transmitted through rechargeable device portion and graphic information related to the rechargeable device is displayed in at least a part of the graphic presentation portion.

DETAILED DESCRIPTION OF THE INVENTION

Figure 1:
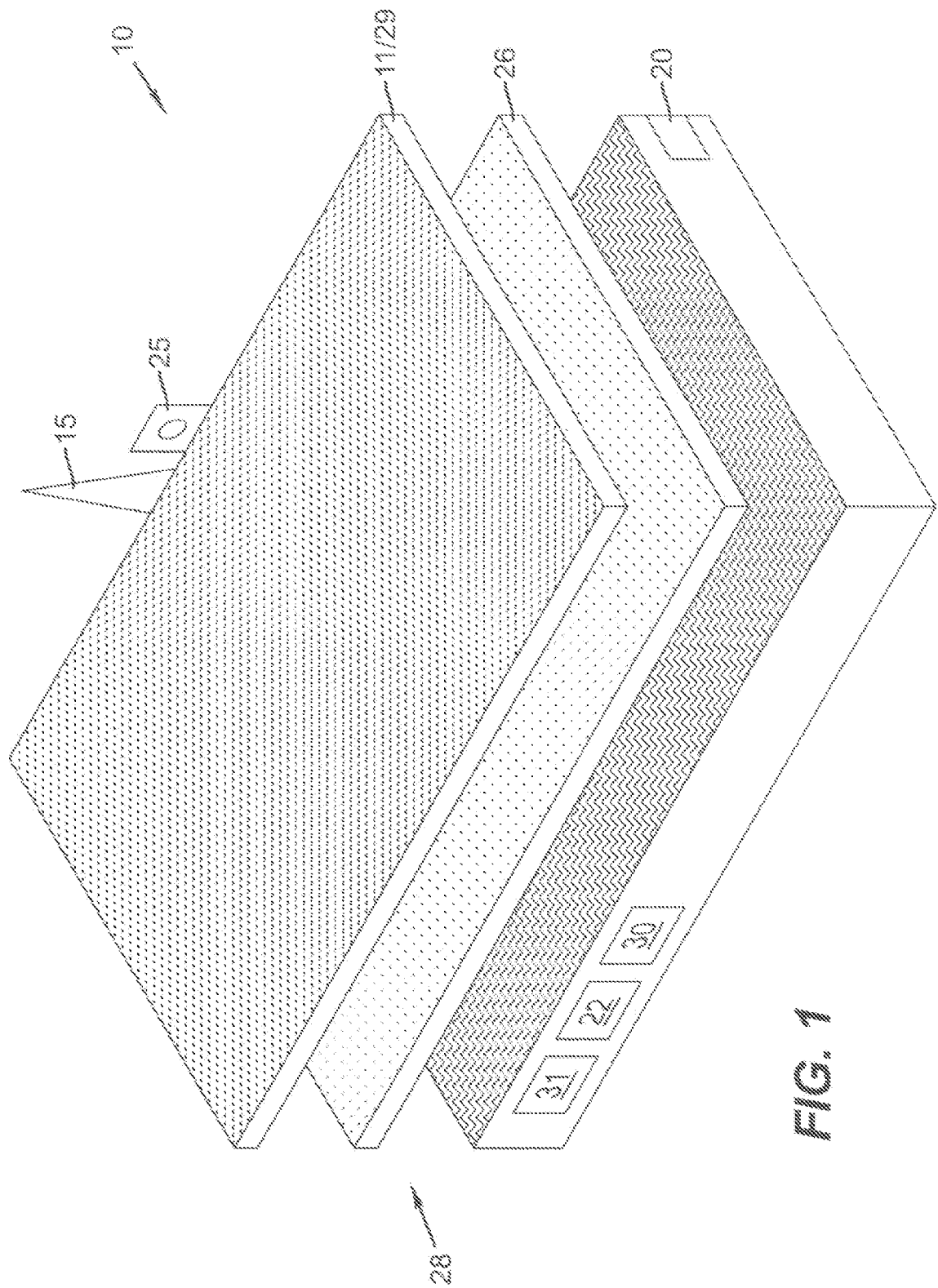
FIG. 1 is an exploded perspective view of one embodiment of a charging display system.
Figure 2:
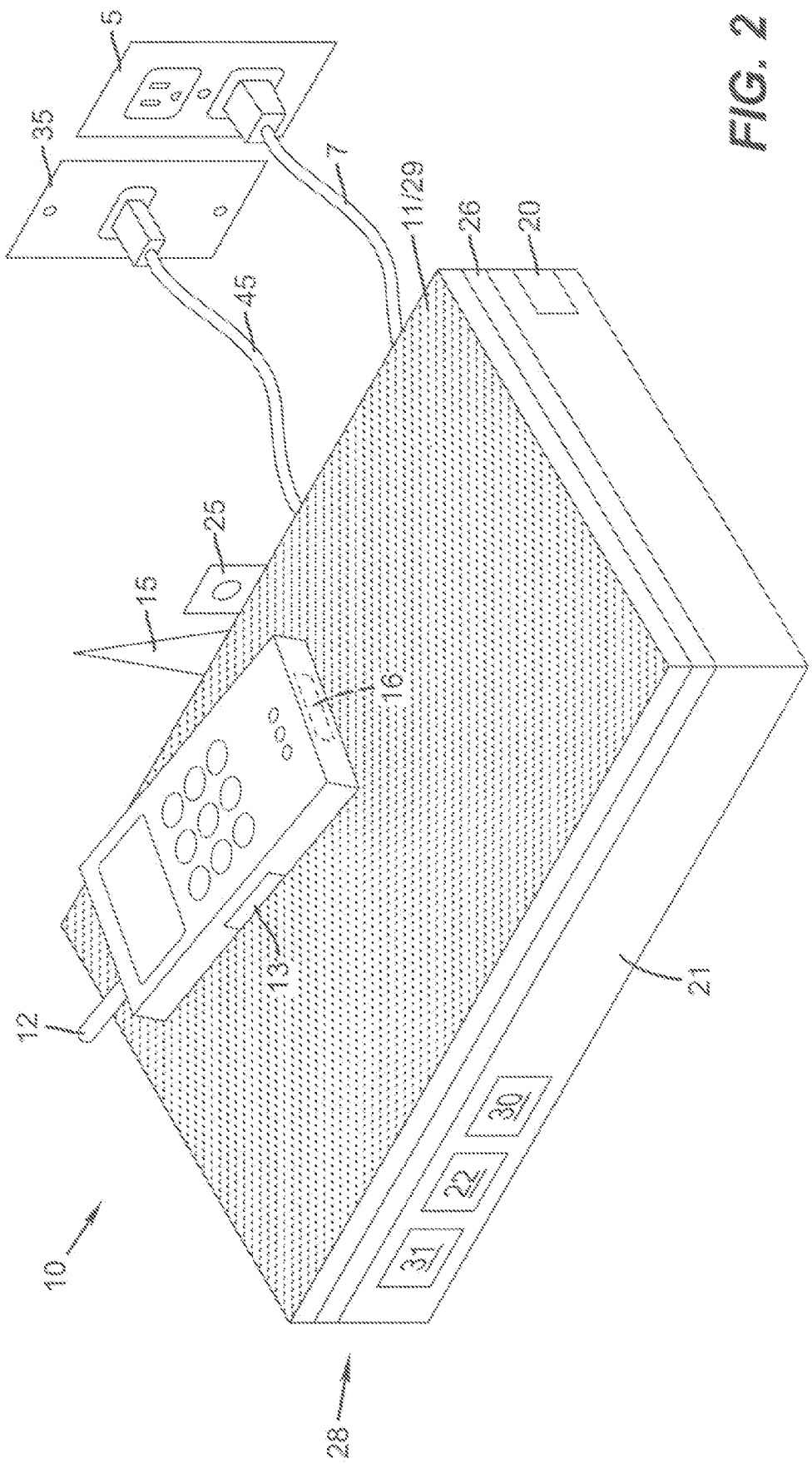
FIG. 2 is a perspective view of an embodiment of FIG. 1 with a contact surface of the charging display system.

FIG. 1 illustrates an exploded perspective view of one embodiment of a charging display system 10, while FIG. 2 illustrates a perspective view of the embodiment of FIG. 1 in an unexploded view and with a wirelessly rechargeable device 12 positioned thereon. In the embodiment that is illustrated in FIGS. 1 and 2, charging display system 10 has a contact surface 11 against which a power receiving element 13 of a rechargeable device 12 can be positioned. A wireless charging system 20 receives power from a power source 5, illustrated here as an AC receptacle that is connected to wireless charging system 20 by way of a power cord 7 which includes a power signal generator circuit 22 that converts the received power into a power signal that travels through contact surface 11 and that is received by a power receiving element 13. Power receiving element 13 has a transducer circuit or other power signal receiving circuit that receives the power signal and that converts the power signal into a form that can be stored in a power supply 16 of the wirelessly rechargeable device 12.

The power signal can take the form of any signal that can transfer power from power signal generator circuit 22 to power receiving element 13 without requiring a connector, or other mechanical structure, to provide a physical conduit for the power signal to travel between power signal generator circuit 22 and power receiving element 13. For example, and without limitation, the power signal can take the form of a broadcast, narrow cast or inductive signal and can use any one or a combination of the following well known power conveying signals, such as inductive signals, light signals, radio-frequency signals, kinetic signals, magnetic signals and/or electromagnetic signals.

Examples of circuits and systems that are capable of generating inductive type power signals are described, for example, in U.S. Pat. No. 3,840,795, entitled "A Hand Held Battery Operated Device And Charging Means Therefore", assigned to SUNBEAM CORP and, U.S. Pat. No. 5,959,433, entitled "Universal Inductive Battery Charger System", assigned to CENTURION INTL INC. Some inductive chargers, such as the Wild Charger™ pad marketed by Wild Charge Inc., Scottsdale, Ariz., U.S.A. are known that can deliver up to 90 W of power, enough to simultaneously charge laptops and small devices such as cell phones, smart phones, portable music players, digital cameras and the like. Other wireless charging systems such as the Splashpad™ by Splashpower Ltd., Cambridge, United Kingdom and, eCoupled from Fulton Innovation LLC, Adu, Mich., U.S.A. provide similar capabilities. With these inductive type of wireless chargers, multiple compatible devices can be placed on the charger pad in any orientation as long as the charging receiver is in close proximity to the charging pad.

Other known systems that are capable of generating such power signals describe the use of a power signal in the form of emitted visible or non-visible light. Examples of this type include: U.S. Pat. No. 6,707,274, entitled "Optical Battery Recharger" and, U.S. Pat. No. 7,079,722, entitled "Apparatus and Method for Transmitting Electrical Power Through a Transparent or Substantially Transparent Medium", assigned to Maxentric Technologies LLC. Each of these use a power signal generator circuit 22 that incorporates an artificial light source, such as an electrically powered lamp, to generate a power signal to transfer energy to a wirelessly rechargeable device 12 equipped with a power receiving element that employs a photovoltaic cell, or cell array, or other type of circuit or system that converts light into power that can be stored in power supply 16 of wirelessly rechargeable device 12. As with the electrical induction techniques the photovoltaic approaches do not require electrical connection, direct physical contact, or fixed orientation, and can be used to charge multiple wirelessly rechargeable devices simultaneously. As long as the power signal is directed at the photovoltaic cells, or other light to power converting circuit or system of power receiving element 13 of wirelessly rechargeable device 12, power will be transferred. For example, U.S. Pat. No. 7,079,722 illustrates that sufficient amounts of electrical power can be transmitted in the form of light through a transparent or substantially transparent medium.

Radio-frequency and other frequencies of electromagnetic radiation that are presently used for wireless data transfer can also be used to provide a power signal that enables wireless charging. For example, frequencies and protocols that are known from wireless data transfer techniques such as Bluetooth, IrDA, wireless networks, and the like can be used in determining the form of the power signal. In certain embodiments, power signals of this type can also be used to transfer data between the charging display system 10 and the wirelessly rechargeable device 12. For example, wireless chargers, such as the aforementioned eCoupled from Fulton Innovation LLC, use a power signal that is modulated or otherwise adapted to also perform the function of transferring data.

In the embodiment of FIGS. 1 and 2, charging display system 10 is equipped with an optional antenna 15 for radio-frequency wireless communication with wirelessly rechargeable device 12, and an infrared communication port 25 for light based wireless communication with wirelessly rechargeable device 12. A wired connector 35 is illustrated that facilitates communication between charging display system 10 and a communication network such as a computer or other data network, a cellular or other telecommunication network.

As is illustrated in FIGS. 1 and 2, a display 26 is positioned between power signal generator circuit 22 and contact surface 11. Accordingly, information and power can be provided in proximity to a wirelessly rechargeable device 12 that is positioned on contact surface 11.

In the embodiment of FIGS. 1 and 2, a sensor system 28 is provided having device sensors 29 that are integrated with contact surface 11 or that are otherwise positioned to sense the presence of wirelessly rechargeable device 12 proximate to or on contact surface 11. Device sensors 29 are adapted to sense the position and orientation of wirelessly rechargeable device 12 when it is within a range of charging positions relative to contact surface 11 within which wirelessly rechargeable device 12 can be recharged by wireless signals generated by power signal generator circuit 22. As will be discussed in greater detail below, sensor system 28 comprises at least one device sensor 29 and a sensor system management circuit 31. This can involve extracting particular information from the signals, converting the signals into a preferred analog or digital form and/or packaging such signals into a preferred form for communication to charging display control system 30. As will be discussed in greater detail below, in some instances the device sensors 29 sense signals or changes in signals that are generated specifically for the purpose of detecting wirelessly rechargeable device 12 or other objects, in such embodiments, sensor system management circuit 31 can include circuits of known design that are adapted to generate or that cause signals to be generated.

Often it will be most convenient to simply position wirelessly rechargeable device 12 directly on contact surface 11. However, it will be appreciated that in many instances wirelessly rechargeable device 12 may be contained within holders, protective covers or the like and that it is preferable that charging of wirelessly rechargeable device 12 be performed without removal of such devices from such holders, covers, etc. Further, in some instances, the user may prefer to provide mountings on contact surface 11 that are shaped to hold wirelessly rechargeable device 12 in a particular manner within the range of charging positions. Accordingly, sensor system 28 can be adapted to sense a position and orientation of a wirelessly rechargeable device 12 that, while not directly in contact with contact surface 11, is within a range of positions in which power signal generator circuit 22 can generate a power signal that is capable of recharging rechargeable device 12.

Sensor system 28 will typically be adapted to sense the position and orientation of wirelessly rechargeable device 12 with reference to the displayable area of display 26 so that determinations can be made as to what to present within the displayable area. The sensed position and orientation of the wirelessly rechargeable device 12 is typically characterized by a sensor system output signal that is generated by sensor system 28. As will be discussed in greater detail below, the sensor system output signal can be in any form that allows display control system such as those illustrated and discussed with reference to FIGS. 4A and 4B to determine the displayable area.

In some embodiments, sensor system 28 and contact surface 11 are integrated to provide a reference surface that can sense when wirelessly rechargeable device 12 is positioned on contact surface 11 or positioned within the range of charging positions relative to contact surface 11.

For example, contact surface 11 can be adapted with a sensor system 28 in the form of an integral touchscreen interface that senses contact between an object and contact surface 11. Such a contact type sensor system 28 is adapted detect an area or representative area of such contact and to provide an output signal from which a position and orientation of an object such as wirelessly rechargeable device 12 can be determined. A wide variety of such touch screen technologies have become known in the art as touchscreen hardware and software has matured over more than three decades. With this maturity, the reliability and marginal cost of touchscreen technology has become such that this technology is routinely incorporated into a wide variety of products with touchscreen displays being found today in airplanes, automobiles, gaming consoles, machine control systems, appliances and handheld display systems of every kind. Any of these forms of touchscreen surfaces can be used in the embodiment of FIG. 1, to sense contact between a wirelessly rechargeable device 12 and a contact surface 11. A wide variety of such contact sensing surfaces are described in detail at: http://en.wikipedia.org/wiki/Touchscreen, some of which are described in whole or in part in the following sections.

In one example embodiment, contact surface 11, sensor system 28 and display 26 can form an integrated touchscreen display, many varieties of which are known in the art including, but not limited to, those sold by ELO Systems and The Minnesota Mining and Manufacturing Company. In this example of a contact type sensor system 28 a resistive touch screen panel is used. Typically, such a resistive touch screen has a display with a surface that is coated with a thin metallic electrically conductive and resistive layer. When an object comes into contact with this surface, a change in the electrical current is created. This change is indicative of an area of the panel that has been contacted. Sensor system 28 detects this change and generates a sensor system output signal based upon the change. The sensor system output signal is typically indicative of an area of the screen that is currently in contact with the object. As will be described in greater detail below, a charging display control system 30 can determine a position and an orientation based upon the area of contact.

In another contact sensing embodiment, contact surface 11 can use a sensor system 28 that makes use of surface wave technology to detect contact. In one embodiment, ultrasonic waves are passed over the contact surface 11 such that when an object contacts contact surface 11, a portion of the waves are absorbed. This change is indicative of an area of the contact surface 11 that has been contacted and sensor system 28 generates a sensor system output signal based upon the change. Here too, the sensor system output signal is typically indicative of an area of contact surface 11 that is currently in contact with the object.

In still another embodiment of this type, contact surface 11 can also comprise a sensor system 28 that utilizes a capacitive touch screen. In this embodiment, contact surface 11 is coated with a material, typically indium tin oxide that conducts a continuous electrical current across the displayable area presented by charging display system 10 to create a controlled field of stored electrons in both the horizontal and vertical axes creating a measurable "normal" or "reference" capacitance. Other electrical devices also have stored electrons and therefore also exhibit capacitance. When the sensor's "normal" or "reference" capacitance is altered by another capacitance field such as where a rechargeable device is introduced into the field of stored electrons generated at the contact surface, electronic circuits of sensor system 28 can detect a change in the capacitance from the "normal" or "reference" capacitance, such as by measuring resultant 'distortion' that can occur in sine wave characteristics of the reference field. Such changes are indicative of an area of contact surface 11 that has been contacted and a sensor system output signal is generated based upon the change. The sensor system output signal is typically indicative of an area of the screen that is currently in contact with the object. As will be described in greater detail below, charging display control system 30 can determine a position and an orientation based upon the area of contact.

Furthermore, contact surface 11 can incorporate a sensor system 28 having a strain gauge configuration to sense contact with contact surface 11 where the screen is spring-mounted on the four corners and strain gauges are used to provide a signal that changes as contact surface 11 is deflected when the screen is touched. This technology can also measure the Z-axis. Examples of this include, but are not limited to, U.S. Pat. No. 4,558,757, entitled "Position Coordinate Input Device" filed by Mori et al. on May 31, 1984. Such changes are indicative of an area of contact surface 11 that has been contacted and a sensor system output signal is generated based upon the change. The sensor system output signal is typically indicative of an area of the screen that is currently in contact with the object.

In still another embodiment, contact surface 11 and sensor system 28 can be combined in the form of a vertical and horizontal array of light beam emitters and sensors (not shown) such as infrared (IR) emitters and sensors arranged parallel to contact surface 11. In this embodiment, when an object is moved proximate to contact surface 11, the light beam near contact surface 11 is interrupted. Such an IR or other wavelength of light beam may also originate or be sensed from within or beneath the contact surface 11 or beneath the display 26.

Another imaging methodology is a relatively-modern development in touch screen technology, in which two or more image sensors are placed around the edges (usually the corners) or beneath the screen. Infrared backlights are placed in the camera's field of view on the other sides of the screen. A touch or device presence shows up as a shadow and each pair of cameras can then be triangulated by sensor system 28 to locate the touch or device. This technology is growing in popularity, due to its scalability, versatility, and affordability, especially for larger units. Furthermore, sensor system 28 can comprise infrared imaging technologies that are now able to create a three-dimensional image and extract objects using commonly known amplitude, time of flight, variable focus and similar measurement techniques. It would be appreciated that sensing contact surface 11 illumination systems can optionally be used to provide incremental functions such as backlighting for display 26 and/or providing power to the wirelessly rechargeable device 12.

In still other embodiments, sensor system 28 can use other technologies, such as dispersive signal technology and acoustic pulse recognition, that may integrate with display 26 and wireless charging system. Dispersive signal technology uses sensors to detect the mechanical energy in the glass that occur due to a touch. Complex algorithms then interpret this information and provide the actual location of the touch. The technology is less susceptible to dust and other outside elements, including scratches. Since there is no need for additional elements on screen, it also provides excellent optical clarity for display and energy transmission. Also, since mechanical vibrations are used to detect a touch event, any object can be used to generate these events, including fingers and styli. Another transparent technology that is significantly advantageous is acoustic Pulse recognition, in which sensor system 28 will use at least two piezoelectric transducers located at some positions of the screen to turn the mechanical energy of a touch (vibration) into an electronic signal. This signal is then converted into an audio file, and then compared to preexisting audio profile for every position on the screen. This system works without a grid of wires running through the screen, the touch screen itself can be made of pure glass, giving it durability. In addition, other high quality, transparent materials may also be used.

In still another embodiment, the functions of wireless charging system 20 and sensor system 28 can be integrated. For example, in a system wherein power signal generator circuit 22 uses inductive charging to charge wirelessly rechargeable device 12, the introduction of a rechargeable device 12 creates a measurable change in the load on the power signal generator circuit 22. An array of inductive charging elements can be distributed co-incident with contact surface 11 and arranged in, for example, a vertical and/or horizontal array (not shown). By mapping which of the inductive charging elements are subject to a change in load, it becomes possible for power signal generator circuit 22 to perform the functions of sensor system 28 by generating an output signal that is indicative of the position and orientation of the wirelessly rechargeable device 12.

Contact surface 11 can enable greater system performance by being generally transparent to allow light generated by, or modulated by, display 26 to pass through contact surface 11 so that such light is visible to a person observing a wirelessly rechargeable device 12 while positioned on contact surface 11. As illustrated, display 26 can be any generally thin display technology, for example, a liquid crystal display, organic light emitting display, or other substantially thin display can be used in conjunction with a light based, electromagnetic or a type of wireless charging system 20. A wide variety of display technologies can be used for display 26 including but not limited to displays of the type that use emissive, transmissive or reflective image elements.

Display 26 can be placed in close proximity to or in contact with contact surface 11. Display 26 can also be constructed as one device with contact surface 11, and optionally formed or assembled as a laminar structure. Further, display 26 can optionally be constructed, formed, or assembled as one device with power signal generator circuit 22 and/or any other components of wireless charging system 20, potentially sharing laminar structures, such as electronic coatings, electronic printings, conductors, glass insulating structures, and the like.

Charging display system 10 is configured so that presence of display 26 between power signal generator circuit 22 and contact surface 11 typically does not significantly degrade the intensity of the power signal and, conversely, so that the operation of display 26 should not negatively impacted by the power signal. In essence, display 26 is to be generally transparent to the power signal. This result can be achieved by selecting a power signal having particular characteristics that are not easily interfered with. For example, the power signal can have a wavelength, frequency or other characteristics that enable the power signal to pass through display 26 and contact surface 11 with minimal interference. Further, display 26 can have a design, a selection of materials, and/or can be manufactured so that it is not particularly sensitive to the power signal or that is shielded from the power signal.

Figure 3A:
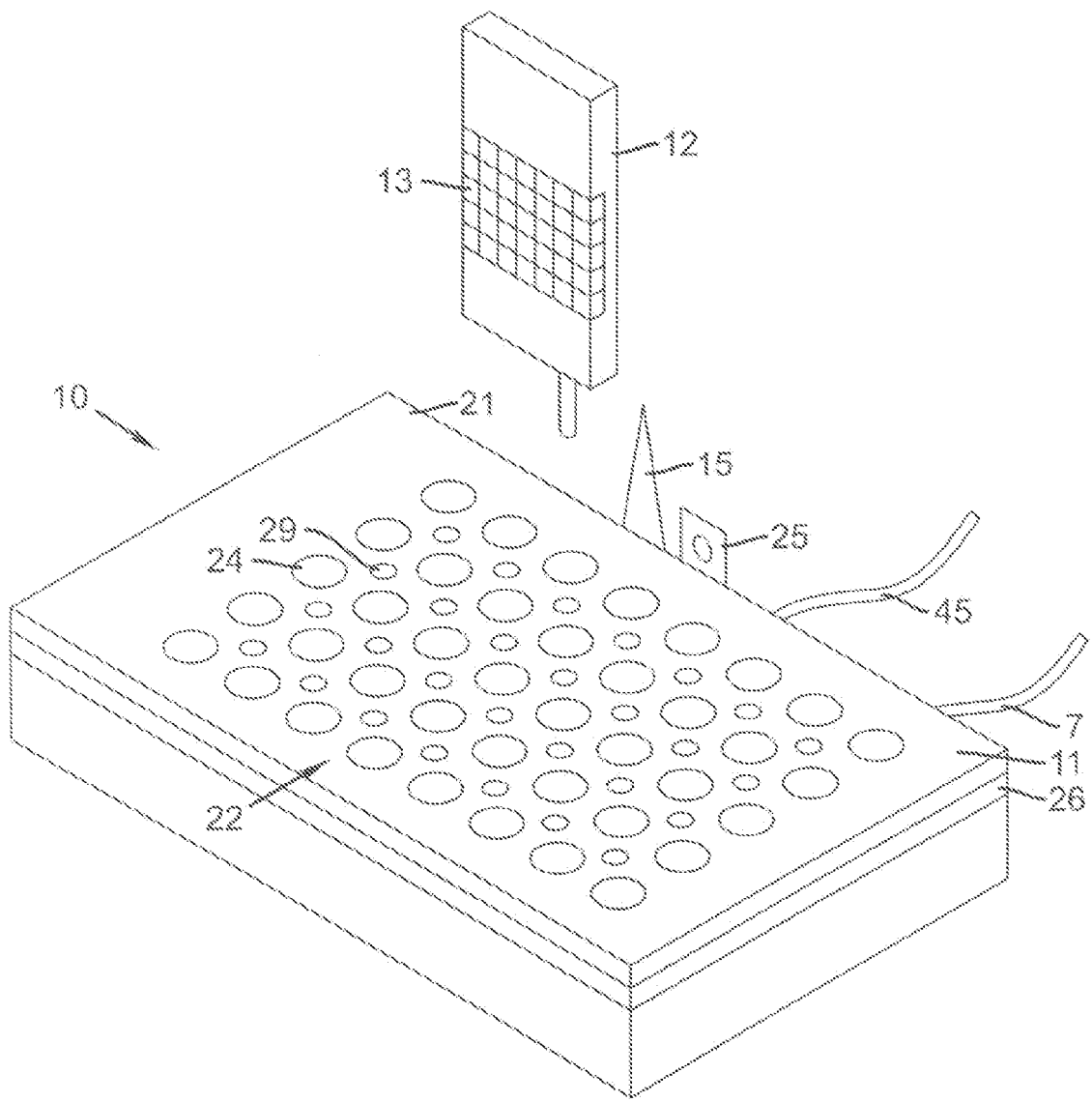
FIG. 3A shows a perspective view of a rechargeable device that can be charged by exposure to a light type power signal approaching the charging display system that generates a light type power signal.

FIG. 3A shows a perspective view of one embodiment of charging display system 10 having a power signal generator circuit 22 comprising a plurality of separately controllable wireless charging elements 24, while wirelessly rechargeable device 12 is equipped with a photovoltaic type of power receiving element 13.

Figure 3B:
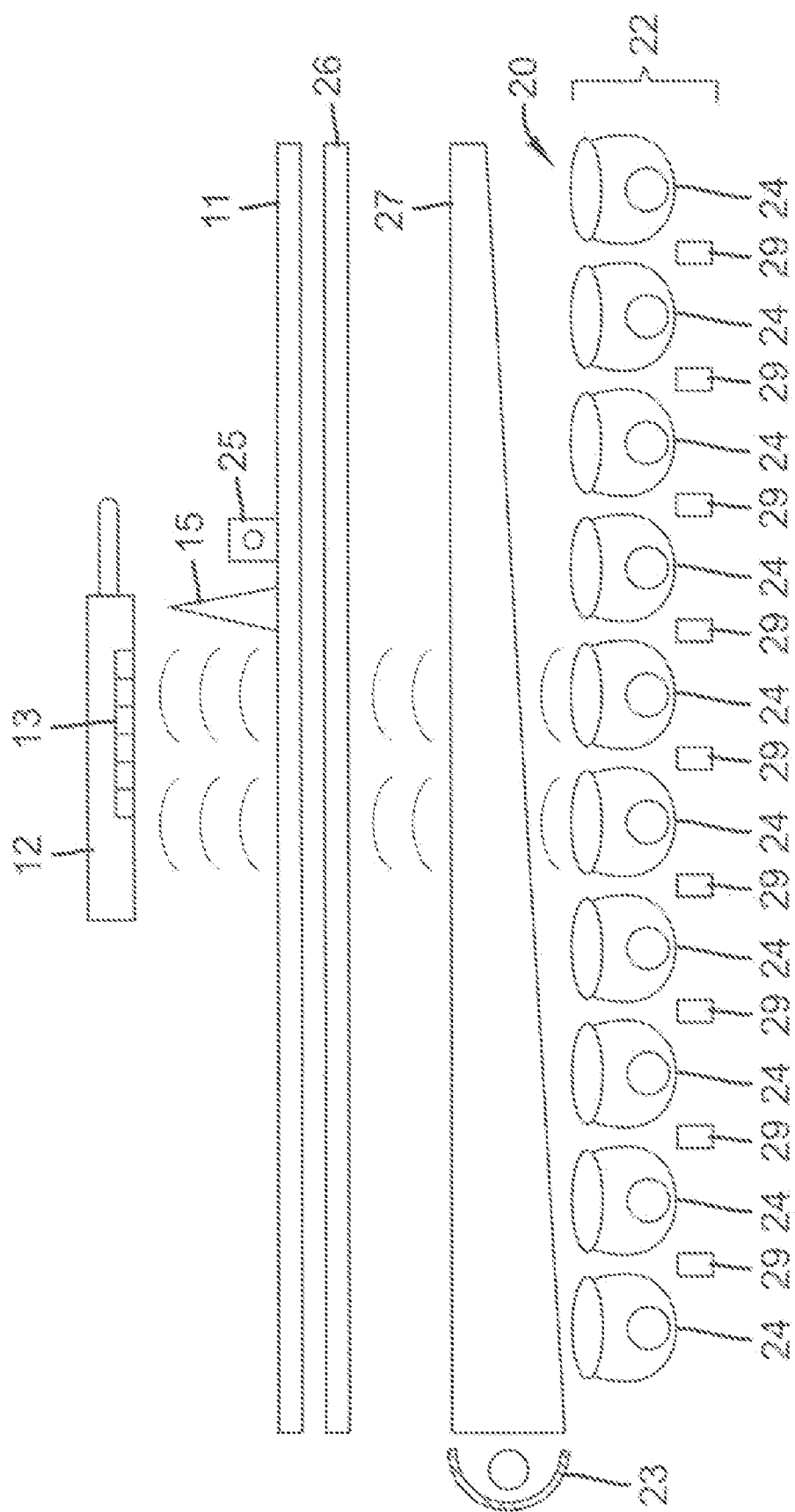
FIG. 3B is an exploded view of the charging display system of FIG. 3A with a rechargeable device on a contact surface of the charging display system.

FIG. 3B is an exploded view of the embodiment of charging display system 10 of FIG. 3A, illustrating display 26 in conjunction with a display primary illumination system 23, wireless charging elements 24 that emit a power signal in the form of light, a light guide 27 for display 26, and a sensor system 28 having an optional plurality of device sensors 29 that are apart from contact surface 11. In this embodiment, device sensors 29 can be photodiodes, opto-interruptors, or imaging arrays such as CMOS or CCD type imagers. Device sensors 29 are adapted to sense the presence of wirelessly rechargeable device 12 proximate to or on contact surface 11. Signals generated by device sensors 29 can also be used to determine a device identification or to enable charging display system 10 to receive a power signal, or data signal from wirelessly rechargeable device 12, as will be discussed below.

In this embodiment, charging display system 10 may also be adapted to provide a dynamic masking of the power signal so that the light emitting type of power signal travels from illumination sources, such as a display primary illumination system 23 and wireless charging element 24, through selected portions of contact surface 11 that confront or otherwise illuminate power receiving element 13.

In this regard, device sensors 29 are provided that are adapted to detect light that is reflected by wirelessly rechargeable device 12 so that the location and orientation of wirelessly rechargeable device 12 on contact surface 11 can be determined.

Accordingly, the signals from device sensors 29 can be used by sensor system 28 to generate a sensor system output signal from which it can be determined which of the plurality of wireless charging elements 24 are to radiate a light which passes through display 26, through contact surface 11 and to power receiving element 13. For example, device sensors 29 can sense a pattern of light reflected by wirelessly rechargeable device 12 at one intensity level and light that is reflected by rechargeable device power receiving element 13 at a second, lower intensity. At a fine enough resolution, the presence of the device can be mapped at a pixel level. This device mapping when done on a pixel by pixel basis, can create a device representation of the device. To conserve power, the pattern of light emitting wireless charging elements 24 used to emit the power signal, can be matched to the location, pattern and orientation of power receiving element 13, as indicated by the reflected light that is sensed. Such a process can be executed in an iterative manner of determining which wireless charging element 24 radiates light that is reflected to a device sensor 29 in a way that suggests that such light was reflected by a power receiving element 13, and using the determined charging elements 24 to supply power to wirelessly rechargeable device 12.

In another embodiment, wireless charging elements 24 can be cycled one by one while charging display system 10 communicates with wirelessly rechargeable device 12 to determine whether activation of a particular wireless charging element 24 increases the intensity of the power signal received by power receiving element 13 of device position on the charging display system 10. This process, likewise, can be iteratively repeated until wirelessly rechargeable device 12 senses receiving a power signal that is approaching a maximum intensity, or until all of the charging elements have been selectively operated with only those that provide a meaningful contribution to charging of wirelessly rechargeable device 12 remain illuminated.

Similar results can be achieved through actual masking. For example, where display 26 is of a liquid crystal type that modulates a backlight, a similar process can be used to determine which portions of the display 26 are to be unmodulated to enable charging of wirelessly rechargeable device 12 with little signal loss in the power signal.

Where desirable, remaining wireless charging elements 24, can illuminate at a reduced level for backlighting display 26, so as to eliminate the need for a separate illumination source for display 26. Alternatively, the remaining illumination sources can be off while the primary illumination system 23 for the display provides the backlight for an LCD type display 26. Other sources for display illumination can be substantially transparent organic light emitting diode (OLED) structures operating in conjunction with or without wireless charging elements 24.

A problem that may be encountered in the charging process may be the absorption of power from the power signal by display 26 which may distort or shorten the life of display 26. Such a problem can be addressed, at least in part, by the above described considerations in the design, materials, and manufacturing of display 26. To provide further protection, display 26 can be operated to provide advanced protection against unintended consequences of such absorption. For example, portions of display 26 through which the power signal from generator circuit 22 will pass can be disabled or adjusted to a relatively transparent position in such areas of display 26. Alternatively, operating frequencies of the refresh signals used to operate display 26 can be selected or adjusted to a frequency, phase, and period in conjunction or with generation of the power signal and its associated frequency phase and period, such as operating out of phase with the charge.

Figure 3C:
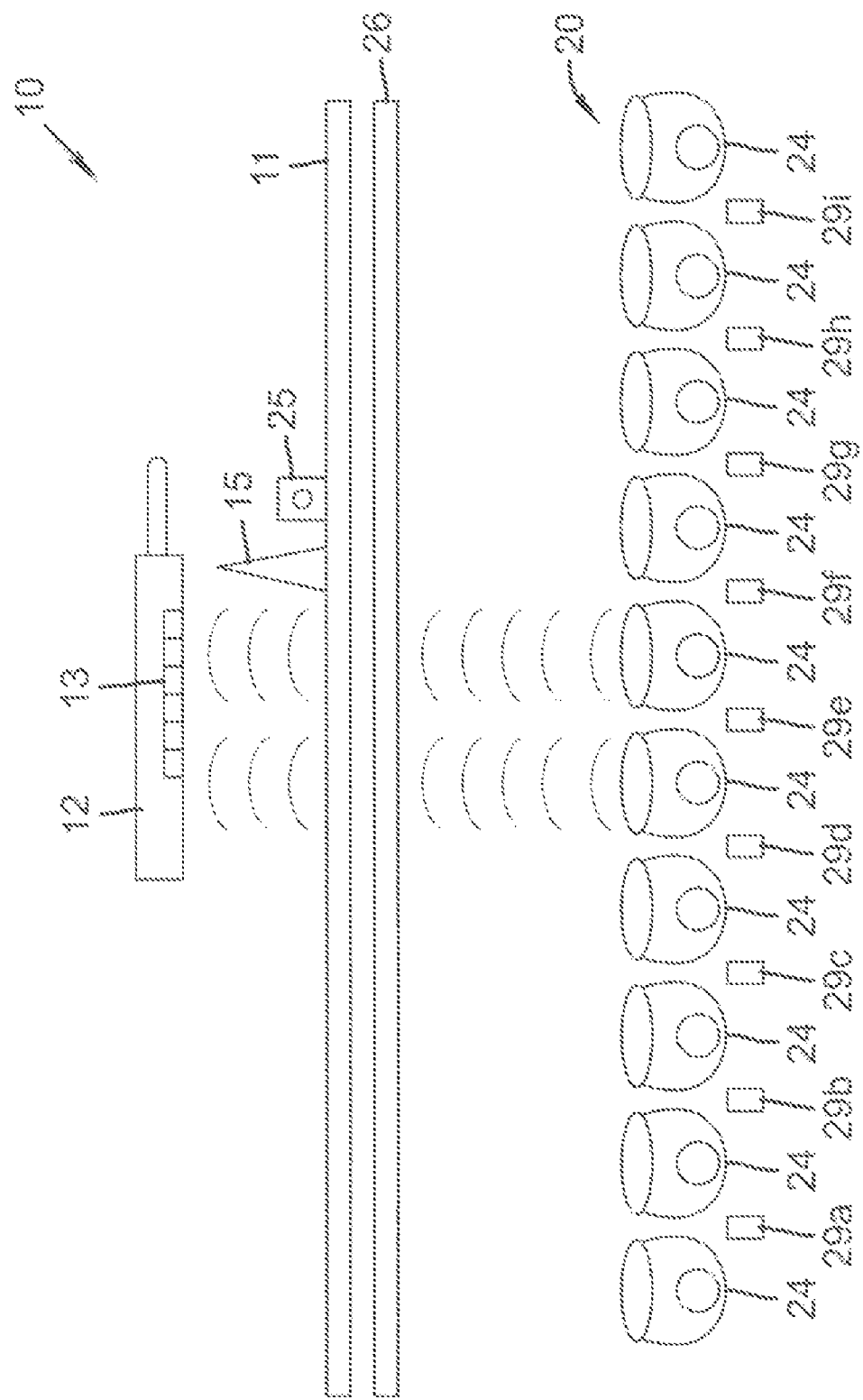
FIG. 3C is an embodiment of a charging display system where the display is a substantially transparent OLED.

FIG. 3C is an embodiment of charging display system 10, where display 26 is a substantially transparent OLED display having a plurality of individual light emitting diodes (not shown) that can be caused to selectively illuminate. For device presence, emission comes from the individual OLED components and device sensors 29 detect light emitted by the OLED that has been reflected by wirelessly rechargeable device 12. Alternatively, it is known in the art that OLED emitters have the capability to create current when exposed to light. Thus, the emitters of such an OLED display can provide the functions of device detection, display illumination and wireless charging. Optional wireless charging elements 24 can also be employed to illuminate power receiving elements 13 to provide power to the wirelessly rechargeable device 12 through elements on the OLED. Furthermore, in FIG. 3C, wireless communication system 14 of wirelessly rechargeable device 12 can communicate with a wireless communication system, such as the wireless communication system 94 illustrated in FIG. 4A, and described in greater detail below. Charging display system 10 can use signals from such a wireless communication system to provide input to display controller 32 as to which of the wireless charging elements 24 (i.e. lamps and or OLED elements) are contributing to charging of wirelessly rechargeable device 12.

FIG. 3C also shows an embodiment, of charging display system 10, where sensor system 28 and power signal generator circuit 22 provide illumination functions that are further adapted to sense when other objects including, but not limited to, human fingers are positioned proximate to or on contact surface 11. In this embodiment, wireless charging elements 24 emit light that can be reflected when a finger or other object such as wirelessly rechargeable device 12 are positioned proximate to or onto contact surface 11. In this embodiment, an amount of light reflected by such a finger or wirelessly rechargeable device 12 is sensed by a sensor system 28 comprising an array of device sensors 29a-29i.

Figure 3D:
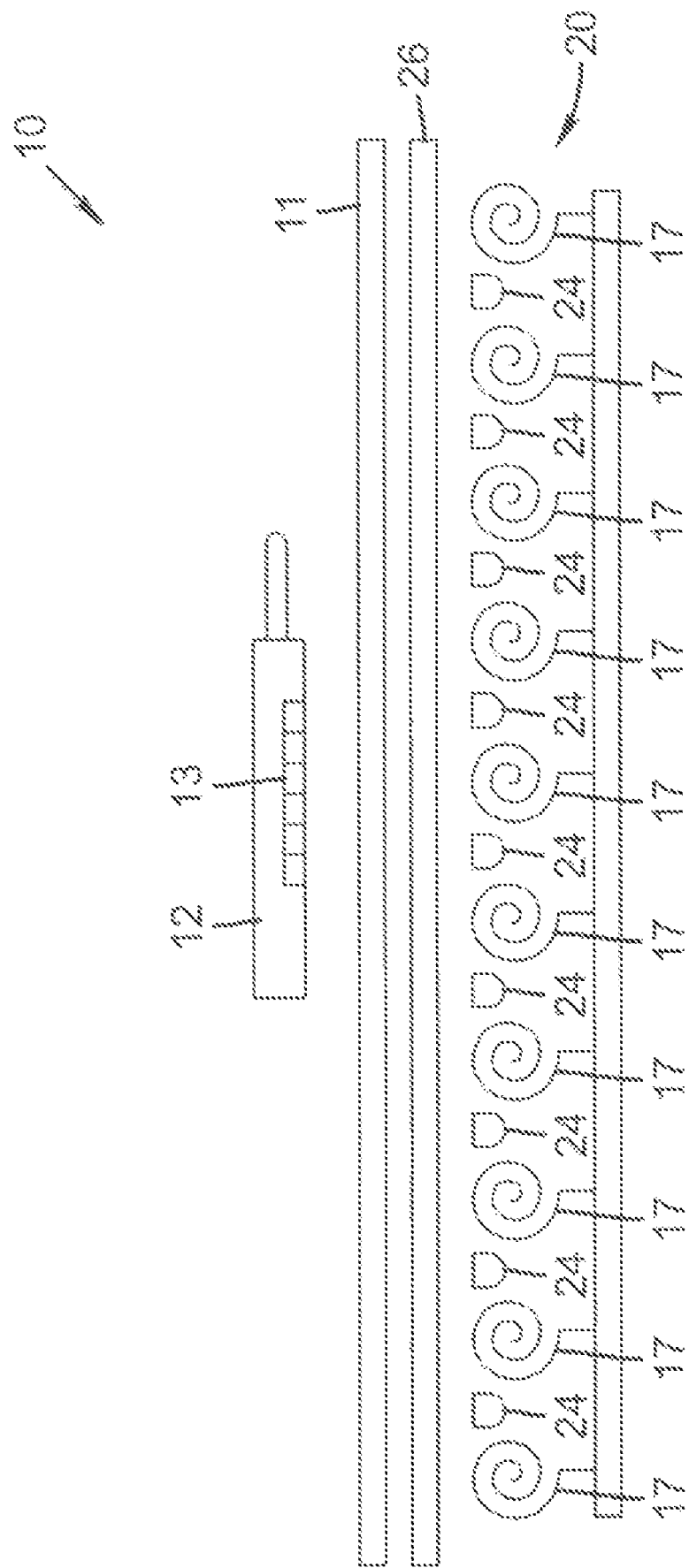
FIG. 3D is an embodiment of a charging display system where the connector less charging device is comprised of a matrix of interspersed inductive and light-based power transfer technologies.

As is illustrated in FIG. 3D, display illumination may be combined with and interspersed with inductive type wireless charging elements 24. For example, in this embodiment, wireless charging elements 24 could be used in conjunction with the inductive technology to provide power transfer to more than one type of rechargeable device 12. This matrix of inductive coils 17 and illumination elements further enables the flexibility of device charging on the display system 10 enabling different devices containing more than one wireless charging technology.

Figure 4A:
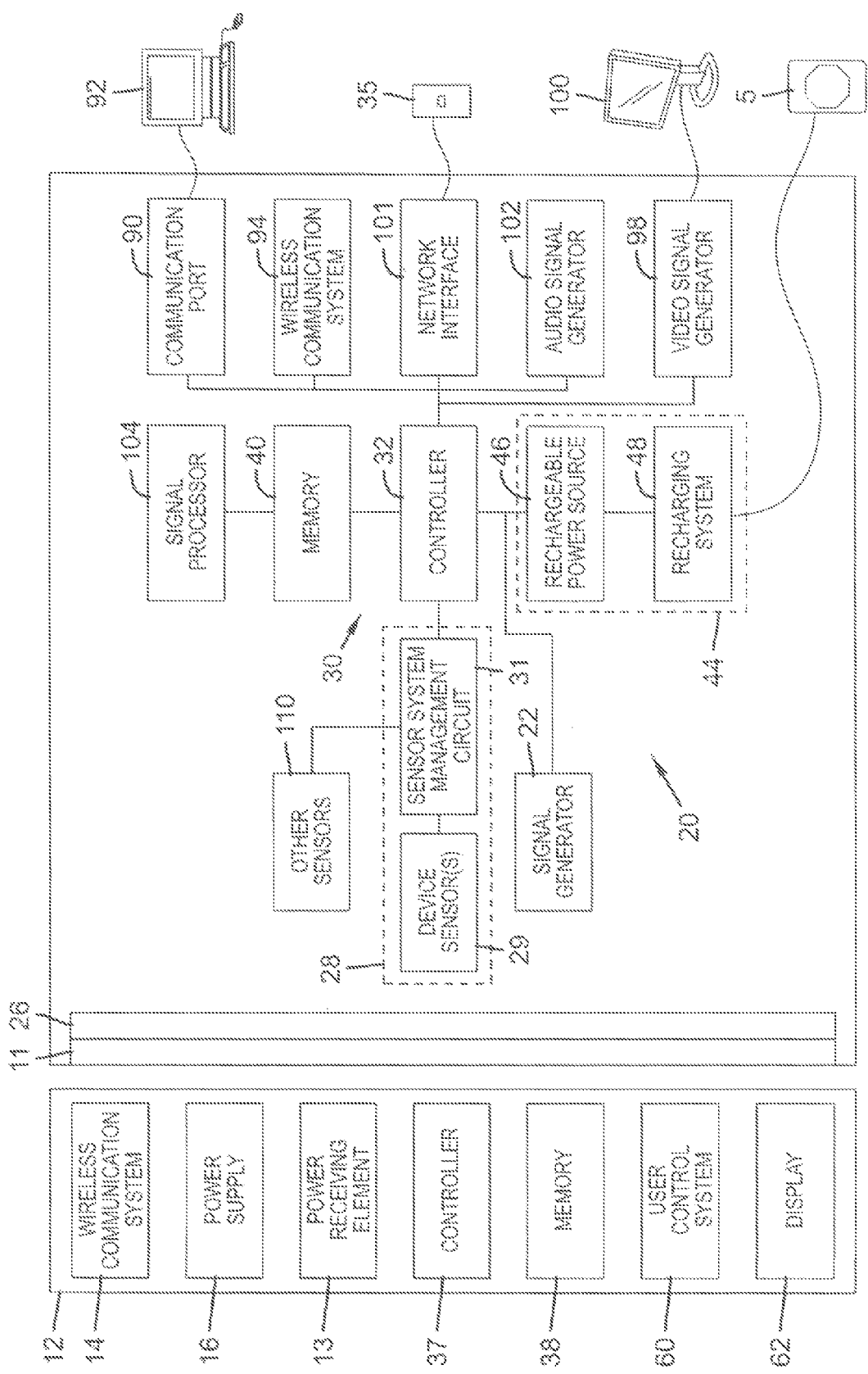
FIG. 4A is a schematic block diagram of one embodiment of the charging display system and an example of a rechargeable device.

FIG. 4A shows a schematic illustration depicting one embodiment of a logical and electrical connection between charging display system 10 and wirelessly rechargeable device 12. As is shown in FIG. 4A, charging display system 10 comprises a control system 30 comprising a charging display controller 32. Charging display controller 32 cooperates with power signal generator circuit 22 to generate signals that are appropriate for data communication and power exchange therethrough. Charging display controller 32 can comprise any circuit or system capable of controlling operation of charging display system 10 as described herein including, but not limited to, a microprocessor, microcontroller, ASIC, programmable analog device or combination of discrete electronics.

Charging display controller 32 is adapted to enable the transfer of data between rechargeable device memory 38 and charging display system memory 40. In one embodiment, this can be done using power signal generator circuit 22 and device sensor 29, respectively, to send and to receive power signals that have been modulated to carry data. Any known type of communication system or circuit adapted to receive wireless signals and power can be used for this purpose. Alternatively, wireless communication system 94 can be used to exchange data with wireless communication system 14 in wirelessly rechargeable device 12. As used herein, the term data comprises data representing one or more still images, sequences of still images, video sequences, video streams, audio sequences, metadata including information about the such still images, sequences of still images, video sequences, video streams, audio sequences, and any other text or data known in the art that can be stored in rechargeable device memory 38.

Charging display system 10 can have a display controller 32 that is adapted to execute data uploads and/or downloads and power charging without the involvement of a personal computer or similar device, however, a personal computer can be involved as desired. Recharging system 48 can receive power from an alternating current source, such as a power cord 7, providing a connection to a 110 volt or other voltage AC source.

In other embodiments, charging display system 10 can have a power supply 44 with an optional rechargeable power source 46, that is capable of storing and providing sufficient wirelessly rechargeable device 12 to enable downloading of data stored thereon and recharging the rechargeable device power supply 16.

It will be appreciated that control of the recharging operation will typically be managed by charging display controller 32 to avoid overheating of and/or damage to rechargeable device power supply 16. Accordingly, a power supply control circuit 52 is provided for managing the recharging operation. In the embodiment shown in FIG. 4A, charging display controller 32 performs this function. Specifically, charging display controller 32 is adapted to sense an amount of power remaining in a battery for wirelessly rechargeable device 12 and to execute a recharging strategy where necessary. In one embodiment, charging display controller 32 exchanges data with rechargeable device controller 37 to obtain data from wirelessly rechargeable device 12 to determine power status. In another embodiment, charging display controller 32 cooperates with a voltage sensor circuit (not shown) that is connected to rechargeable device power supply 16. Such a voltage sensor circuit can take any a variety of forms that are well known in the art for sensing a voltage level and for providing a signal from which a controller can make a determination as to whether to engage in a charging operation.

Where charging display controller 32 determines that it is necessary to charge rechargeable device power supply 16, controller 32 can operate power signal generator circuit 22 to generate a power signal that can be received by power receiving element 13 and used to charge power supply 16. On occasion, wirelessly rechargeable device 12 will have a power supply 16 comprising a nickel cadmium battery. To ensure that such batteries have a long useful life, and to ensure that they maintain their storage capacity, such batteries should be recharged only where these batteries have been first drained of, substantially, all stored power. Accordingly, in one embodiment where charging display controller 32 determines that charging display system 10 is likely connected to a wirelessly rechargeable device 12 having such a nickel cadmium battery, controller 32 can be adapted to execute a recharging strategy that first insures that such a nickel cadmium type of power supply 16 is drained of substantial amounts of power before causing power signal generator circuit 22 to generate the power signal to charge the rechargeable device power supply 16. This can be done by reversing the charging process such that wirelessly rechargeable device 12 transmits a power signal to the charging display system 10 using, for example, wireless communication system 14, or where possible by reversing the operation of power receiving element 13. In one embodiment of this type, where charging display system 10 contains a rechargeable power source 46, the process of charging a rechargeable device power supply 42 can comprise, first discharging the power from rechargeable device power supply 42 and storing it in rechargeable power source 46, then using the stored power in a subsequent recharging option.

Figure 4B:
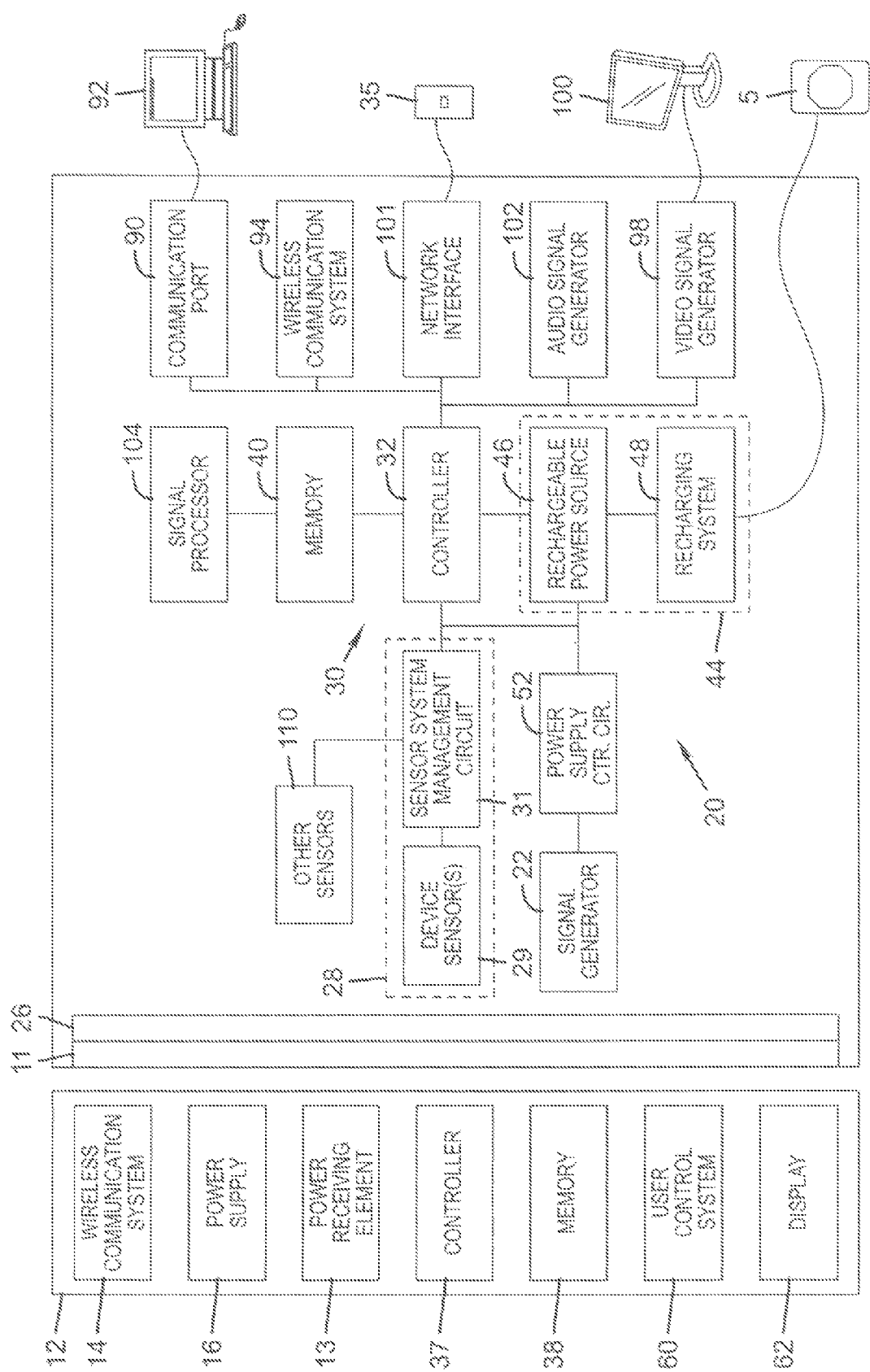
FIG. 4B is a schematic block diagram of another embodiment of the charging display system and a rechargeable device.

FIG. 4B illustrates another embodiment of charging display system 10 that is generally similar to the embodiment of FIG. 4A. However, in this embodiment, charging display control system 30 includes a power supply control circuit 52 that can control power flow along an optional direct path 53 from charging display power supply 44 to power signal generator circuit 22. Power supply control circuit 52 is separated from charging display controller 32 and which can comprise any other form of controllable device, or circuit, that can initiate and control an amount of or rate of power transfer and that can terminate power transfer. In this way, recharging of rechargeable device power supply 42 can be performed at times when charging display controller 32 and/or rechargeable device controller 37 are not active. For example, the amount of time required to charge rechargeable device power supply 42 is typically substantially longer than the amount of time required to download data from rechargeable device memory 38 to display system memory 40. Thus, it is possible to conserve energy during a charging and downloading sequence by operating charging display control system 30 to enable charging display controller 32 and/or rechargeable device controller 37 only where they are being used for controlling data transfer and, thereafter, disabling controller 32 and/or rechargeable device controller 37 so that they do not consume power or otherwise operate in a power conservation mode during a portion of the recharging operation wherein data is not being transferred.

Returning now to FIG. 4A, charging display controller 32 is also used for purposes such as determining when to initiate a data exchange and/or charging sequence, cancel data exchange or and/or charging session or for adjusting a data exchange and/or transfer sequence. Display 26 can be used to provide information to a user of charging display system 10 including, but not limited to, the status of conditions in charging display system 10 and/or wirelessly rechargeable device 12. For example, display 26 can provide at least one visible indication from which a user can determine, at least one of: the relative amount of power and indication of charging operations or the extent to which the process of recharging the rechargeable device power supply 42 has been completed. Typically, charging display controller 32 will be adapted to operate display 26.

Figure 6A:
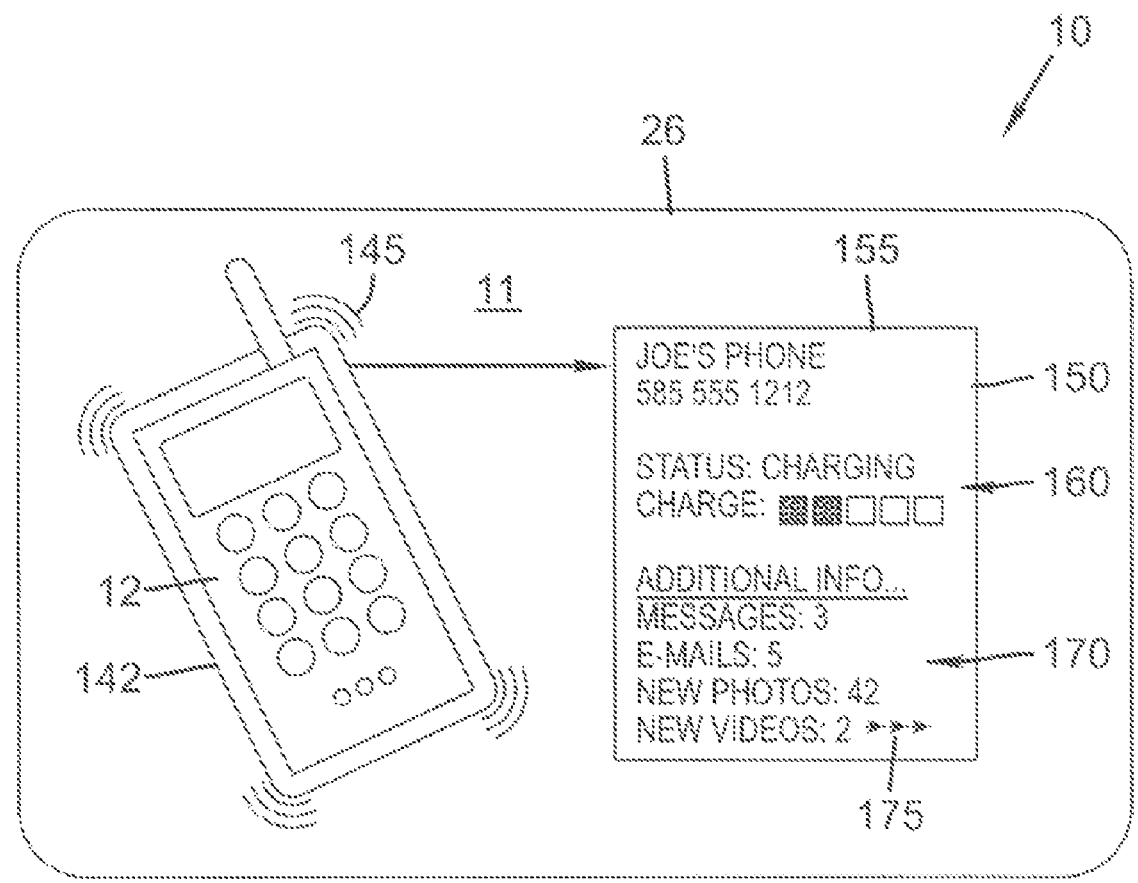
FIG. 6A is an overhead view of a rechargeable device resting on the charging display system with a display presenting a graphic output signal based on one position of the rechargeable device on the surface of the display with the associated display presenting graphic output outside of the area of the rechargeable device.

Referring to FIGS. 4A and 6A, display 26 can also provide a visible indication of the status of an action of transferring data between the rechargeable device memory 38 and the display system memory 40. Charging display controller 32 will typically be adapted to operate the charging status indicator 160 to provide an accurate indication of the status of the data and power transfer.

Charging display system memory 40 can take any of a variety of forms. Charging display system memory 40 can comprise an internal memory device that is incorporated into charging display system 10 and is difficult to remove from wireless charging system 20 or charging display system memory 40 can comprise a memory that is adapted for easy removal from charging display system 10, or any combination thereof. For example, in one embodiment, memory 40 comprises both of a hard disk drive such as an IBM Microdrive™ with a large disk drive capacity, for example, >10 GB and a removal memory such as a CompactFlash or secure digital memory card. Charging display system memory 40 can take other forms, and can comprise, for example, an optical disk writer adapted to convert image related content received by charging display system 10 into optically encoded data record on a disk such as a digital versatile disk or a compact disc. Charging display system memory 40 can also take the form of semiconductor memory and/or other forms of memory capable of storing digital data. It will be appreciated that the relationship between the memory storage capacity of charging display system memory 40 and the memory storage capacity of rechargeable device memory 38 determines, in general, the number of times that image related data from rechargeable device memory 38 can be downloaded to charging display system memory 40 before display system memory 40 is fully utilized.

Charging display system 10 will typically have a memory 40 with sufficient memory capacity to store any data provided by wirelessly rechargeable device 12 in multiple downloading sessions such as a memory capacity that is a multiple of the memory capacity of rechargeable device memory 38. However, in other embodiments, charging display system 10 will have memory 40 with a memory capacity that is equal to or even less than the memory capacity of rechargeable device memory 38. Such an arrangement can, nevertheless, be useful in enabling a user of wirelessly rechargeable electronic device 12 to effectively extend the image storage, capture and presentation capacity of wirelessly rechargeable device 12 to a meaningful extent while offering a light weight, low cost and/or small sized charging display system 10. In any embodiment, the memory capacity of charging display system memory 40 can be effectively augmented by sharing or storing.

A user can manually designate what content stored in wirelessly rechargeable device 12 is to be uploaded to charging display system 10. This can be done by way of displaying a user interface on display 26 in conjunction with contact surface 11 to provide interactive menus for loading information into charging display system 10. Alternatively, charging display system 10 can have a controller 32 that is adapted to determine alone, or in combination with rechargeable device controller 37 when wirelessly rechargeable device 12 has data stored in the rechargeable device memory 38 that has not yet been stored in charging display system memory 40 and that is adapted to automatically cause such data to be stored in memory 40. In certain embodiments, charging display controller 32 can be further adapted to cause selected data to be removed from rechargeable device memory 38 after the image related data has been successfully transferred to charging display system memory 40.

It will be appreciated that in one embodiment, charging display system 10 provides a measure of protection for wirelessly rechargeable device 12 when rechargeable device 12 is located proximate to or on contact surface 11. For example, charging display system 10 of FIG. 1 can have a cover (not shown) and body 21 that are adapted to provide vibration stability when charging display system 10 is used in an automotive application.

Charging display system 10 can optionally provide additional functionality. For example, as shown in FIG. 4A, charging display system 10 provides an additional connector 90, or wireless connection, adapted to engage an external data device 92, such as the personal computer shown in FIG. 4A, a kiosk (not shown), an image viewer (not shown), a computer network (not shown), a communication system such as a wired telephone (not shown), a personal digital assistant (not shown), or like circuit or system.

This can comprise, for example, a conventional RS 232 connection, a Universal Serial Bus (USB) connector, an Ethernet connection, a FireWire connection, traditional telephone line or the like. This enables charging display system 10 to be connected directly to a personal computer, kiosk, or like device for uploading of images from charging display system memory 40 to such a personal computer or kiosk.

In certain embodiments, charging display system 10 can also use additional connector 90 to receive power directly from the external data device 92 for providing recharging power to an embodiment of charging display system 10 having a rechargeable power source 46. For example, the USB system provides a line that can convey limited amounts of power from a personal computer or other USB enabled device through the USB connection. This limited amount of power can be used to charge rechargeable power source 46 over time.

Furthermore, when charging display system 10 is connected to an external data device 92 and functions in a manner allowing convenient transfer of data from wirelessly rechargeable device 12 to external data device 92. Further, rechargeable power source 46 can be recharged with power supplied, for example, by an external power source 5, with power supplied by external data device 92 or some combination thereof.

Also shown in FIG. 4A, is a wireless communications system 94, such as a cellular telephone, or paging communication system. Such a system can be used by charging display system 10 to automatically upload image related data from system memory 40 to a remote server or to the wirelessly rechargeable device 12. In this way, charging display controller 32 can determine when the amount of data stored in charging display system memory 40 exceeds a threshold and can automatically cause data to be transferred from charging display system 10 to a external device such as a computer, network or kiosk, or other like device so as to make additional memory capacity available for storage of later obtained image related data.

Alternatively, wireless communication system 94 can comprise a wireless communication system such as a radio frequency, non-radio frequency, or other wireless electromagnetic signal, infrared or other wireless communication system that can communicate with and control wirelessly rechargeable device 12, using a user interface in conjunction with contact surface 11 with feedback on the display 26. In addition, a wireless communication system 94 and a user interface in conjunction with contact surface 11 may communicate with a personal computer, kiosk or the like for transferring data.

A video signal generator 98 can also be provided that is adapted to generate video output signals representative of image data, or other data, generated by charging display control system 30 or stored in the charging display system memory 40 and that is further adapted to enable display 26 or an external display device 100 to receive the video output signals so that an external display device 100 can be used to present images, such as images that are representative of the images stored in the charging display system memory 40 to a television or other external video.

As is also shown in FIG. 4A, charging display system 10 can also comprise an audio signal generator 102 adapted to generate audio output signals representative of sound stored in the display memory or resident on the portable charging device and an output circuit adapted to enable an external device to receive the audio output signals so that the external device can present sound representative of audio data, such as sound data, that is stored in the charging display system memory 40 or rechargeable device memory 38.

As is further shown in the embodiment of FIG. 4A, charging display system 10 can have a signal processor 104 adapted to modify image, audio or other data, such as by adjusting the data compression strategy used for storing the data or by adjusting the content of the data scene duration. Examples of such content based adjustments include, but are not limited to, scene sequencing, aspect ratio information, rotation, apparent magnification, or crop adjustment, color correction, exposure correction, red eye correction, and/or adjusting the image related data by inserting text, graphics, or metadata in an image. Charging display controller 32 can also be used for such purposes.

As is further shown in FIG. 4A, charging display system 10 can further comprise control and integration functions for detection or optional illumination electronics associated with the sensing technologies incorporated in the sensing contact surface 11.

It is noted, that the charging display system 10 may additionally provide room for storage of other items, such as retractable power cord 7, data cables, the portable rechargeable electronic device's operation manual, and the like.

Figure 5:
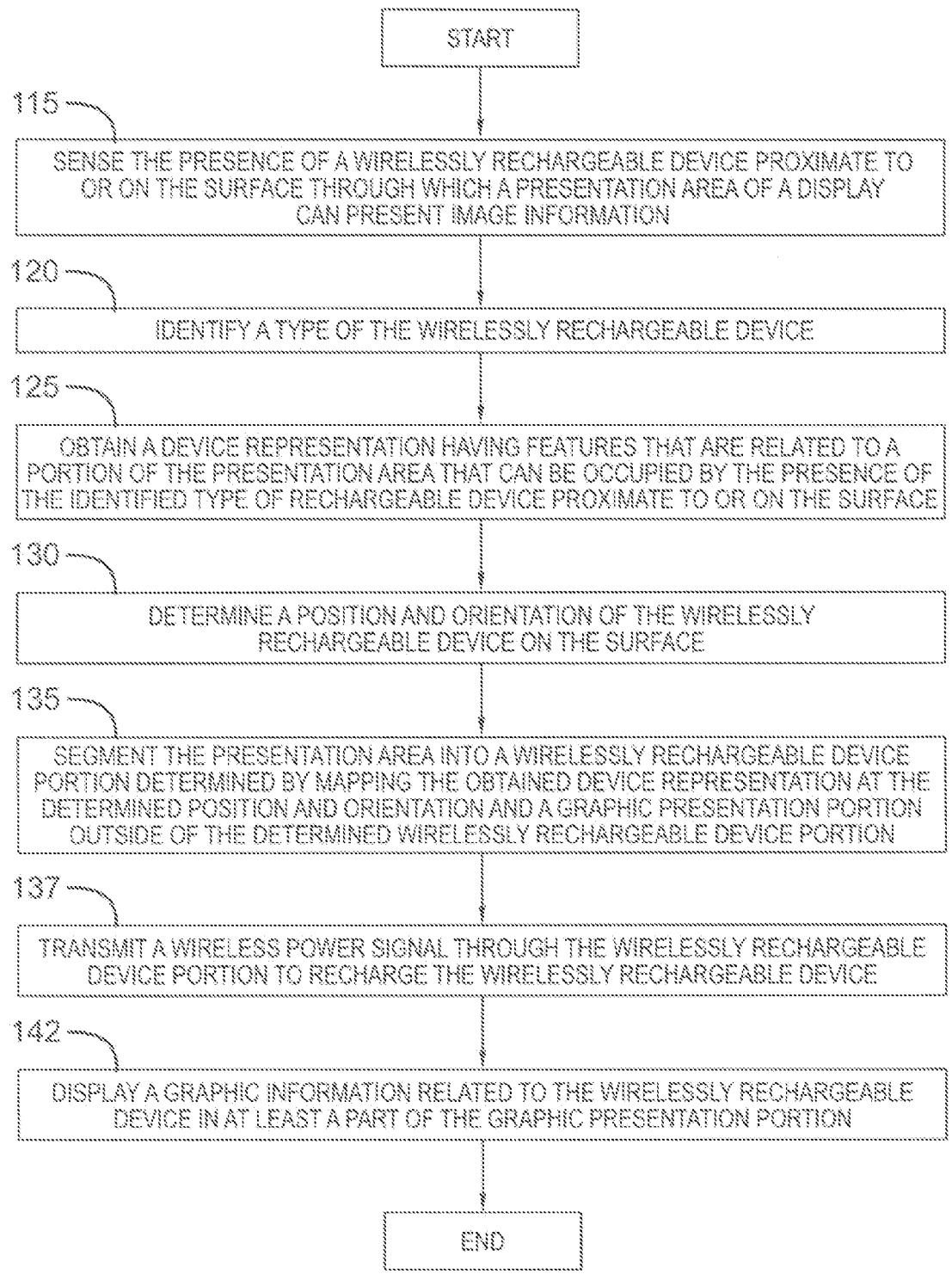
FIG. 5 is a flow diagram of one embodiment of a method for operating a charging display system.

FIG. 5 is a flow diagram of one embodiment of a method for operating a charging display system 10 having a charging system that is capable of charging a wirelessly rechargeable device 12 when rechargeable device 12 is positioned proximate to or on contact surface 11. In step 115, presence of wirelessly rechargeable device 12 proximate to or on contact surface 11 is detected. This can be done with the associated touch sensing or imaging technologies as described previously. Wirelessly rechargeable device 12 can also transmit a presence indicating signal that charging display system 10 can detect and can use to determine therefrom that rechargeable device 12 is on contact surface 11. In other embodiments, wirelessly rechargeable device 12 can periodically generate a signal such as an audible, electromagnetic, vibration, optical or other signal that can be sensed by device sensors 29 and/or other sensors 110, such as thermal, sonic, radio-frequency, capacitance, humidity or any other known sensors, in the charging display system 10. For example, a cellular phone periodically emits a brief signal identifying itself to local cellular telephone towers. These can be sensed by the charging display system 10 and used to determine the presence of the wirelessly rechargeable device 12.

In still other embodiments, power signal generator circuit 22, device sensor system 28 and/or device sensor 29 can be used to sense the presence of wirelessly rechargeable device 12. For example, where inductive charging is used, a power signal can be supplied by power signal generator circuit 22 along the inductors periodically and the presence of wirelessly rechargeable device 12 can be sensed from the presence of an inductive load. The wirelessly rechargeable device can be identified by analysis of load characteristics, load patterns and/or other aspects of the load. Alternatively, wirelessly rechargeable device 12 can sense the transmitted signal and generate a feedback signal in a form that charging display system 10 can receive and interpret to determine the presence of rechargeable device 12.

In further embodiments, the presence of a wirelessly rechargeable device 12 can be detected by causing charging display system 10 to periodically generate a local signal that is adapted to provoke a response from rechargeable device 12 and detecting the provoked response. For example, charging display system 10 can use wireless communication system 94 to generate a Bluetooth signal causing the wirelessly rechargeable device 12 to respond with a Bluetooth signal that can be sensed by wireless communication system 94. Similarly, charging display system 10 can generate a stimulating signal causing the cellular phone embodiment of wirelessly rechargeable device 12 to generate a detectable output signal. For example, the stimulating signal can comprise a signal that simulates an incoming telephone call, causing wirelessly rechargeable device 12 to generate an output signal, such as a phone ring or vibration, that can be detected by other sensors 110 of charging display system 10.

The charging display system 10 then identifies a type of the wirelessly rechargeable device 12 (step 120). This can be done in a variety of ways using any form of communication that can be made between charging display system 10 and wirelessly rechargeable device 12 including, but not limited to, sensing touch points on sensing contact surface 11 and referring the touch points map to a look-up table that can identify the device. In addition the use of wireless communication schemes such as radio frequency, infrared, RFID, bar codes, unique reflective surface combinations and the like can communicate a device ID that can be interpreted by the control system. It will be appreciated that one or more of the components used by charging display system 10 to display images, to charge wirelessly rechargeable device 12 or to communicate wirelessly with rechargeable device 12 can be used to exchange data sufficient to identify the type of rechargeable device 12.

In certain embodiments, wirelessly rechargeable device 12 can be identified using the same systems, signals and/or methods that are described above as being used to determine the presence of rechargeable device 12 proximate to or on contact surface 11. Optionally, such identification information can be encoded or determined as a part of detecting the presence of the wirelessly rechargeable device 12 (Step 115) and that the methods discussed, with respect to detecting such presence, can also be used to determine the type of device such as imaging or profiling rechargeable device 12 and correlating the image or profile of the device to a look up table of images and devices, or reading the any printed or displayed data on the device using optical character recognition technology in conjunction with a imaging elements.

The type of wirelessly rechargeable device 12 can be identified in any number of ways including, but not limited to, uniquely identifying rechargeable device 12, such as by detecting or reading an electronic serial number or other form of identification data, detecting or reading other data that characterizes a device or a device type such as a serial number, ESN or other device specific identification, or by detecting or reading an identification of the device owner, operator or renter. The type of wirelessly rechargeable device 12 can also be determined by detecting characteristics of the device as discussed elsewhere herein.

In step 125, a representation of the device is obtained having features that are related to a portion of the presentation area that can be occupied by the presence of the identified type of rechargeable device 12. The device representation can be any of a variety of known forms, and can, without limitation comprise an outline, perimeter map, silhouette, shadow, image, etc., or other presentable representation for wirelessly rechargeable device 12. At least one feature of the device representation is determined based upon the device type. Where applicable, the device representation can be created using images obtained from a sensor system 28 of the type that uses an imaging system to sense the presence of wirelessly rechargeable device 12 proximate to or on contact surface 11. Additionally, the device representation may be obtained via a signal generated by the device in conjunction with the location of the device's touch points and/or power receiving element 13. Touch points may be stand off pads that have other uses such as scratch prevention pads when a device is placed on a table. Similarly, a representation may be obtained via a communication network that can be accessed by the electronic device or the charging display system 10.

In step 130, the position and orientation of wirelessly rechargeable device 12 relative to contact surface 11 is determined. This can be done a variety of ways. For example, proximity of contact between contact surface 11 and wirelessly rechargeable device 12 can be sensed using the above described touch sensing embodiments of sensor system 28. Wireless communication system 94 can be used to determine a position and orientation of wirelessly rechargeable device 12. Similarly, as is also described in greater detail above, sensor system 28 can have device sensors 29 that are positioned and adapted to sense the position and orientation of wirelessly rechargeable device 12. Further, device sensor 29 can be integrated to form one or more images that can capture an image of an area wherein a wirelessly rechargeable device may be seen when it is proximate to or on contact surface 11. This allows this area to be imaged on a pixel by pixel basis. These pixel values are then mapped to the surface of display 26.

In step 135, charging display controller 32 and/or video signal generator 98 are used to segment the presentation area into a wirelessly rechargeable device portion and a graphic presentation portion. In the embodiment illustrated, this is done by mapping the obtained device representation at the determined position and in the determined position and allocating at least a part of the remaining available portions of the presentation area as the graphic presentation portion which can be used in presenting menus, data, device control, and user interface sensing contact controls.

In step 137, the device charging is enabled through transmission of a wireless power signal through and directed toward the wirelessly rechargeable device portion that charges the battery. The data for the location of power receiving element 13 may be embedded in the device perimeter map file or in relation to the touch points of wirelessly rechargeable device 12. Further, enhancement and optimization of device charging can be accomplished by iterative charging of the associated charging elements in the general proximity of the power receiving element 13. The optimum charging power emitting from power signal generator circuit 22 can comprise of pulsing the associated elements in close proximity to the primary charging elements. Feedback from wirelessly rechargeable device 12 may provide power signal generator circuit 22 with associated information to the charging status. As wireless charging elements 24 are switched ON and OFF to enable optimum charging, an optional step of disabling the display pixels in close proximity to the charging area in conjunction with charging may prolong the life of the display and increase charging efficiency. Similarly, the display and charging operator may alternate if benefits to each system are realized.

Graphic information related to the rechargeable device is then displayed in at least a part of the graphic presentation portion. (step 140). This process typically involves determining graphic information for presentation in the graphic presentation portion of display 26, arranging the graphic information for presentation within the graphic presentation portion and, generating a displayable output signal based upon the obtained graphic information. Graphic information is related to the rechargeable device in some way. The graphic information can provide, for example and without limitation, information that facilitates or that indicates that one or more of a group of interaction options is available for execution, is being executed, requires additional information, requires user interaction, or has completed executing.

In one embodiment, the graphic information is related to the rechargeable device by being based upon, or associated with, one of a group of interaction options that, at least in part, define various interactions that can occur between the charging display system 10 and the type of wirelessly rechargeable device 12. Each interaction option is related to some function or capability that wirelessly rechargeable device 12 and charging display system 10 are capable of performing including, but not limited to, recharging, data transfer, preference setting mainframe and the like.

There are a variety of ways in which this can be done. In one embodiment, this can be done by using the obtained device type to determine one or more interaction options and by comparing each interaction option to a library of graphic information that is associated with the set of determined interaction options, and determining a displayable output signal based upon the graphic information derived from the library. Such a library can comprise a look up table or other logic structure that associates the determined device type with a set of interaction options and may be located in charging display system memory 40 of charging display system 10 or in a memory 38 of wirelessly rechargeable device 12. In still another embodiment, the determined interaction options can be provided to a location where graphic information is contained and from which a displayable output signal can be generated. For example, a particular memory location in charging display system 10, or in a computer, such as external data device 92, to which charging display system 10 is connected can contain the graphic information and can provide this graphic information related to an interaction option upon request. Similarly, the determined interaction options can be associated with a network address that network interface 101 can use to obtain graphic information associated with one or more of the interaction options. Alternatively, charging display controller 32 can execute algorithms that automatically generate the graphic information based upon the determined interaction options.

Graphic information can comprise static and dynamically adjustable information including, for example, static format and labeling defining areas in which variable information such as charging status or download status information can be presented. The graphic information can also be completely dynamic with displayed features, menus and user interfaces adjusting to the determined presence and identified type of the wirelessly rechargeable device 12.

It will be appreciated from above that interaction options can be determined based upon the type of wirelessly rechargeable device 12 and, as generally defined herein, such interaction options can relate to any possible interaction the combination of rechargeable device 12 and charging display system 10 may have. The options can include operational interactions such as those that are related to the operation of wirelessly rechargeable device 12 such as diagnostic testing, software, firmware and/or operation system upgrading, and charging operations. The interaction options can include data exchange and transfer options such as those that indicate the presence of data on the rechargeable device that is available for downloading or the availability of data to be transferred to wirelessly rechargeable device 12. Such data can comprise any form of digital data including, but not limited to, still image data, text data, and data characterizing other forms of static graphic images, data representing sequences of still images, video data including, but not limited to, MPEG 4, Quicktime™ or other video image data, consumable consumption data representing an amount of a consumable used by the wirelessly rechargeable device 12, such as for example, ink, pigment, receiver material used by a printer, a number of hours of operation of a device having a limited life such as a vacuum bag, or other information characterizing for example usage patterns, damage or other factors related to the device.

As is also noted above, such interaction options can involve or occasion the presentation of graphic information on display 26, such as can occur in support of recharging operations. More specifically, before, during, or after recharging has begun, charging display controller 32 can generate a displayable output signal that can cause display 26 to present graphic information in the graphic presentation area of display 26 indicating charging modalities, voltage requirements, battery type, battery condition charge level, charge status or that indicate to a user any manner of information related to the recharging process and/or any other interactions that involve or that are related or that occur as a result of the location of wirelessly rechargeable device 12 on contact surface 11 of charging display system 10 including, but not limited to, any form of communication that facilitates, supports or otherwise is related to any interaction between rechargeable device 12 and charging display system 10.

The interaction options can also involve the provision of instructions occasioning a specific use of the wirelessly rechargeable device 12. For example, some rechargeable devices are password protected so that they enable certain functions to be executed only when these wirelessly rechargeable device 12 have had particular codes entered into them using the user control system 60 of such a rechargeable device. Accordingly, the interaction options available can involve presenting specific information or requests that enable a user to more easily know when to enter the password and how to do this. Such a result is particularly valuable during a first time use or a first time of recharging of wirelessly rechargeable device 12.

Similarly, the interaction options can involve diagnostic interactions wherein a user is called upon to make specific entries at the user control system 60 of wirelessly rechargeable device 12 so that the reaction, if any, of rechargeable device 12 to such inputs can be sensed for example by wireless communication system 94 or device sensor 29 of charging display system 10 allowing such a reaction or the absence of such a reaction to be detected.

Finally, it will be appreciated that the interaction options can also involve operations related to integrating the functionality of the devices. For example, the interaction options can include interactions where features of the wirelessly rechargeable device 12 and charging display system 10 cooperate to provide functionality that is greater than either device is capable of providing. For example, wireless communication system 14 can be of a type that is different than wireless communication system 94. Thus, each enables a different form of wireless communication but neither offers both. When these devices are functionally integrated, either form of wireless communication can be enabled. It will be appreciated that a wide variety of options are available when the devices are integrated.

Determination of the interaction options can be made in a variety of ways using the determined device type. In one example, each type can contain data that inherently indicates the type of interaction options available with wirelessly rechargeable device 12. In another example, the determined type of the rechargeable device is applied against a look up table or other logic structure that associates the determined type of the device with a set of interaction options and the associated user interface. In still another embodiment, the determined type of the wirelessly rechargeable device 12 may indicate a location where information regarding the interaction options can be found, such as a particular memory location in charging display system 10, in a computer such as external data device 92 to which charging display system 10 is connected or a network address that network interface 101 can use to obtain graphic information identifying the interaction options. Examples of various types of displayable output signals, supporting particular interaction options, are provided in FIGS. 6-9.

FIG. 6A is an overhead view of a wirelessly rechargeable device 12, resting on a contact surface 11 and charging display system 10, through which graphics presented on a display 26 can be seen. As is illustrated in FIG. 6A, display 26 is partitioned into a wirelessly rechargeable device portion 142, as described above, and a graphic presentation portion 150. In this example, interaction options are determined that include charging, message reporting, and picture and video data transfer. As is shown in FIG. 6A, graphic information related to these interaction options is presented within graphic presentation portion 150. As is shown in this example embodiment, the graphic information is presented in the context of display menu 155 and includes a charging status indicator 160, an enlarged version of the rechargeable device-specific contents display indicator 170, an uploading and downloading indicator 175 having arrows that provide visual feedback associated with data transfer and, a dynamic charging indication 145 that provides a graphical display indicating the charging process is continuing and also indicating that an area of the contact surface 11 is being used for this purpose.

Figure 6B:
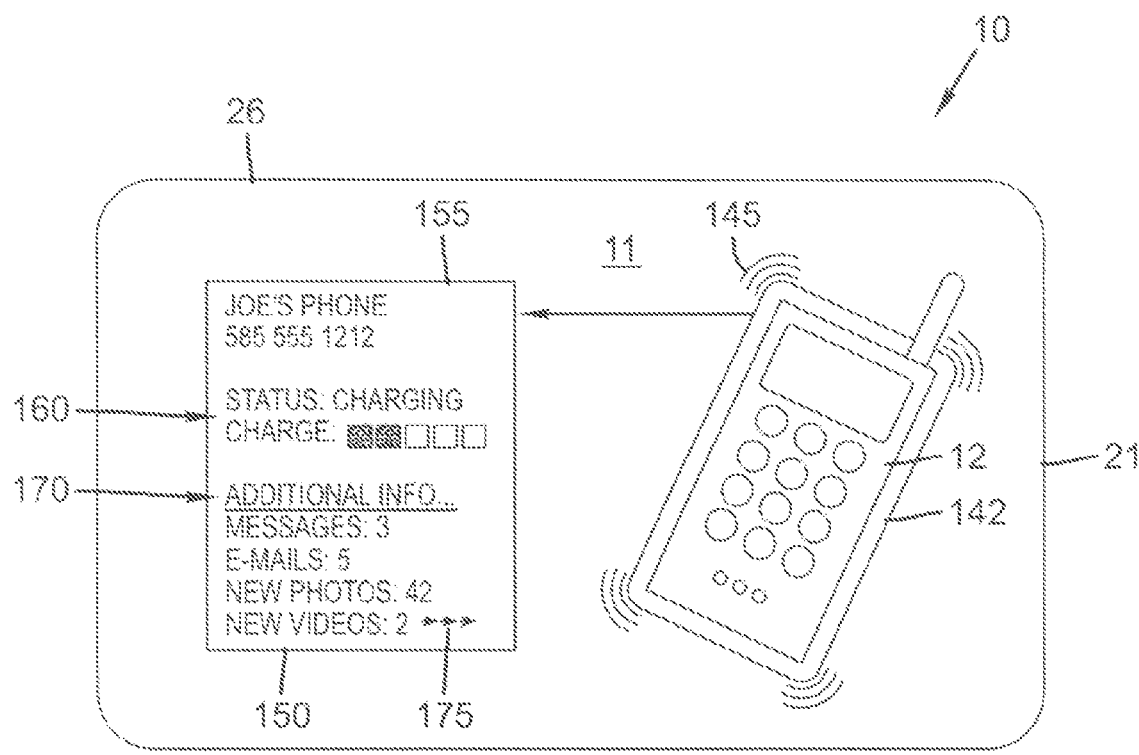
FIG. 6B is an overhead view of a rechargeable device resting on the charging display system with a display presenting a graphic output signal based on a second position of the rechargeable device on the surface of the display with the associated display presenting graphic output outside of the area of the rechargeable device.

FIG. 6B is an overhead view of wirelessly rechargeable device 12, resting in an alternative position on charging display system 10. The graphic presentation portion 150, although identical to the one in FIG. 6A, is mapped to a graphic presentation portion 150 of display 26 that is located apart from the location shown in FIG. 6A. It will be appreciated that the location has changed based upon a change in the location of wirelessly rechargeable device 12. Similarly, the wirelessly rechargeable device portion 142 of FIG. 6B is mapped to a position that is different than the position that is illustrated in FIG. 6A. This is also based upon the location and orientation of wirelessly rechargeable device 12. It will be appreciated that graphic presentation portion 150 can be zoomed larger or smaller (not shown) based on the position of wirelessly rechargeable device 12 on contact surface 11. Furthermore, it will be appreciated that graphic presentation portion 150 and the elements of display menu 155, such as contents display indicator 170, may be divided into two smaller display menu components (not shown) where the location and orientation of wirelessly rechargeable device 12 suggests a need for this.

Figure 7A:
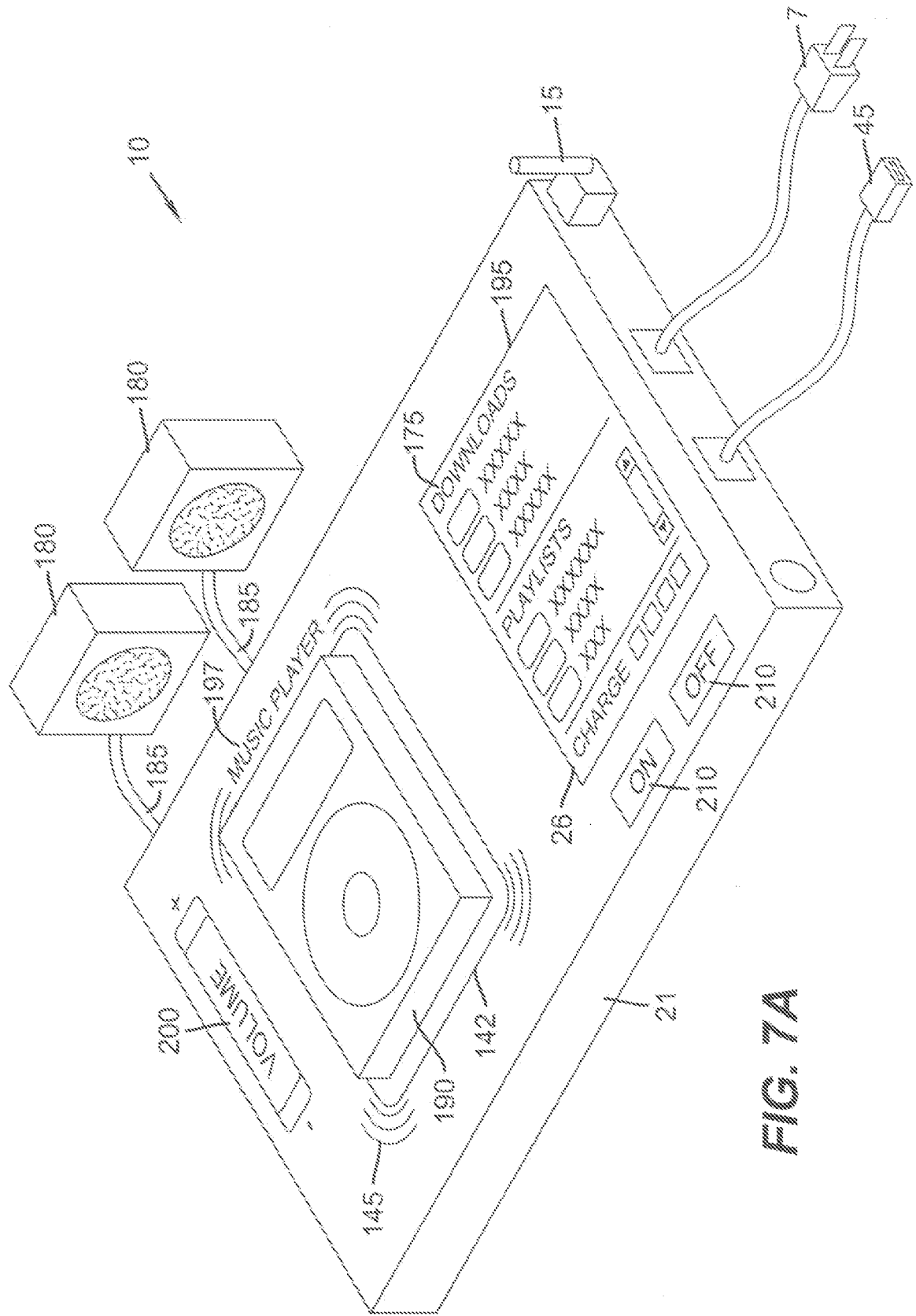
FIG. 7A shows a perspective view of the rechargeable device with power and multiple network connection types and, with a display presenting an output signal; and virtual keypad menus based on the device location.

FIG. 7A is another embodiment of wirelessly rechargeable device 12 in the form of a music player that may or may not incorporate a display for either cost or size requirements. Here the interaction options for charging display system 10 and wirelessly rechargeable device 12 include recharging audio download and play list presentation. Accordingly, charging display control system 30 segments display 26 into a wirelessly rechargeable device portion 142 surrounded by a graphic presentation portion 150 that presents a display menu 155, and a UI display 195 that presents information related to the interaction option. UI display 195 can be used to enable the user to make human inputs allowing wirelessly rechargeable device 12 to communicate with home, public or private wireless networks via wireless communication antenna 15, or communication networks such as the internet via data communication cable 45 for the purposes of sharing, exchanging or obtaining songs, podcasts, media or other data. In addition, in this embodiment, charging display system 10 is equipped with speaker wires 185 and speakers 180 that can be connected, for example, to audio signal generator 102 for purposes of headphone free playback and operation before, during or following the charging operation. As is further illustrated in FIG. 7A, a designated virtual volume control 200 graphic is presented which can be used to provide a visual indication of a volume control setting that can provide visual support for a virtual user input that may control the output of the music player and/or, volume for audio signal generator 102 within the charging display system 10 is enabled by sensing contact surface 11. Virtual power controls 210 can also provide feedback, a status indication, or visual support for a virtual user input of user interface functions that may be associated with charging display system 10 or music player 190.

Figure 7B:
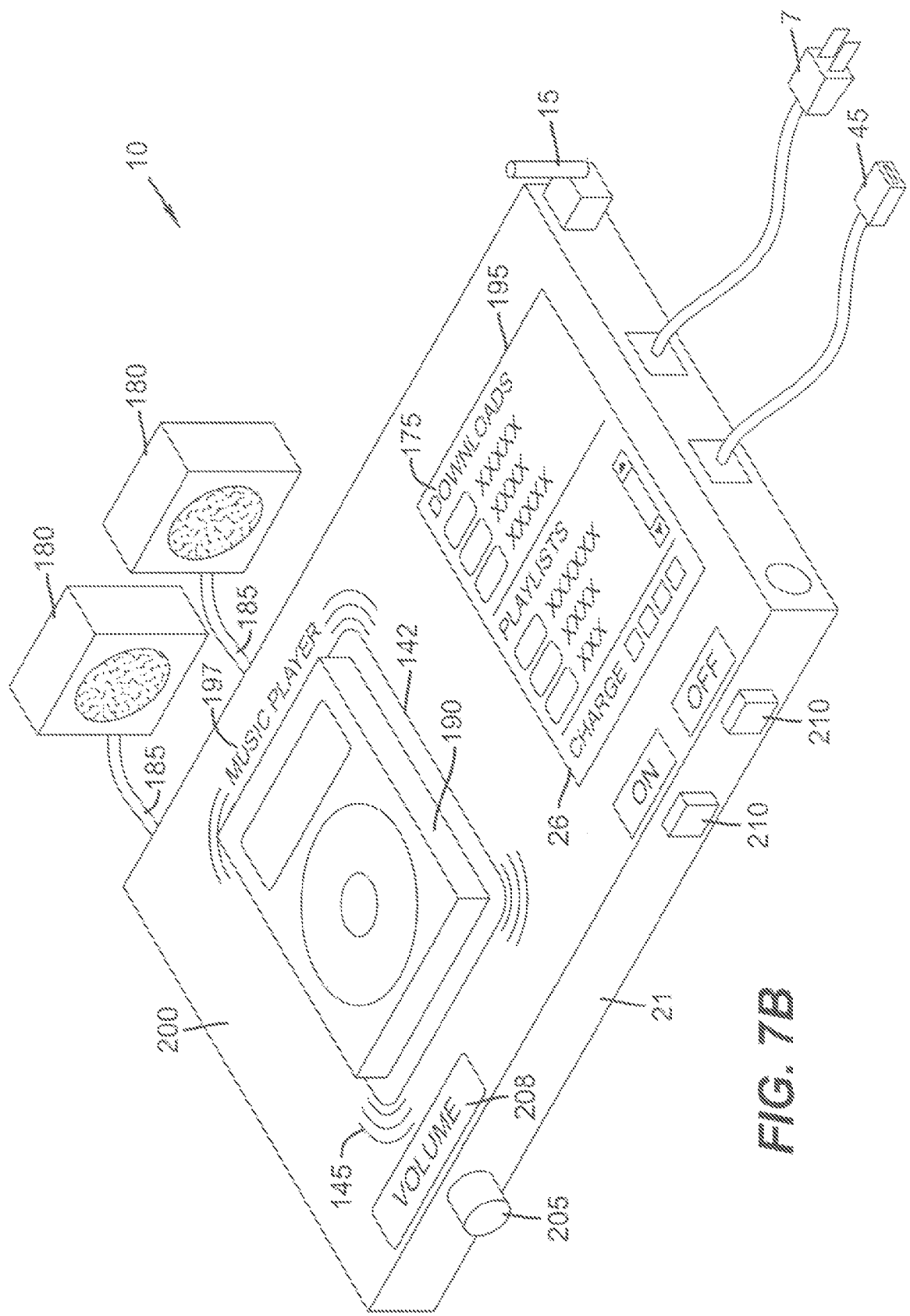
FIG. 7B shows a perspective view of the rechargeable device with assigned controls based on the device and device location.

FIG. 7B is another embodiment of charging display system 10 having a wirelessly rechargeable device 12 in the form of a music player 190 resting on or proximate to contact surface 11. In this embodiment, charging display system 10 has physical controls shown here as a designated volume control knob 205 and control buttons 211. As is shown in this example, interaction options are associated with these physical controls and wherein graphic information is associated with the physical controls and is presented proximate to the physical controls with which it is associated. For example, graphic information 215 is placed adjacent to control buttons 211 for user understanding that these control buttons have an assigned role in determining the ON or OFF state of charging display system 10. This flexibility can enable control assignment to be variable based on the mode of the device as well. For example, play lists may be scrolled using this knob when in the play list mode (not shown). Then, after the user has selected music for playback, the knob may be designated by the "volume" graphic indication 208 presented proximate to a designated volume control knob 205. It is further appreciated that touch interfaces and graphics assignment will dynamically update if the rechargeable device is moved upon sensing contact surface 11.

Figure 8:
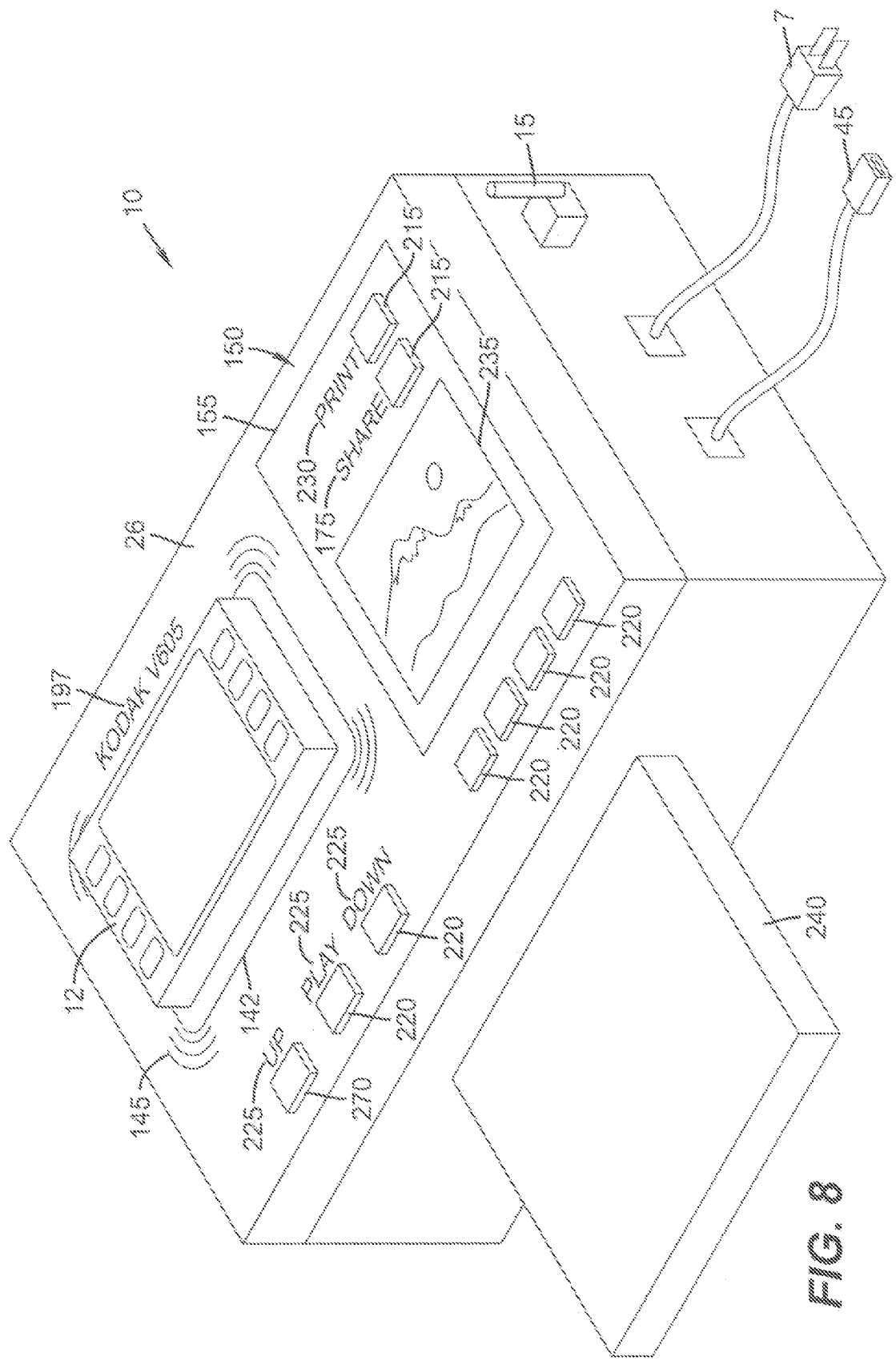
FIG. 8 shows a perspective view of a rechargeable device with mapped data, menu and assigned interface associated with device location.

FIG. 8 is an embodiment of charging display system 10 in the form of a printer 240. Printer 240 can use a dye sublimation, inkjet or any other well-known technology to provide hard copy based images. Shown on printer 240 is wirelessly rechargeable device 12 with wirelessly rechargeable device portion 142 surrounded by a graphic presentation portion 150. Display menu 155 is shown in a portion of graphic presentation portion 150 above wirelessly rechargeable device 12. Graphic presentation portion 150 is dynamically positioned on the surface of display 26 based on wirelessly rechargeable device 12. Data/media representation 235 is shown in graphic presentation portion 150 along with uploading and downloading indicator 175 and print indicator 230. Designated controls 220 may be adapted to the device function in the form of control assignment graphic 225 in conjunction with the features of charging display system 10. Designated controls 220 for media viewing may in this embodiment be mechanical switches or touch pads on charging display system 10. However, in this embodiment, sensor system 28 is adapted to sense touching of a finger or object on contact surface 11 so that a user can make a user input by virtue of contact on the contact surface proximate to a preferred use of print indicator 230 or uploading and downloading indicator 175 since the device map for these functions is within graphic presentation portion 150. Printer 240 can also cause graphic information to be presented to indicate printing media usage and status to the user (not shown).

Figure 9:
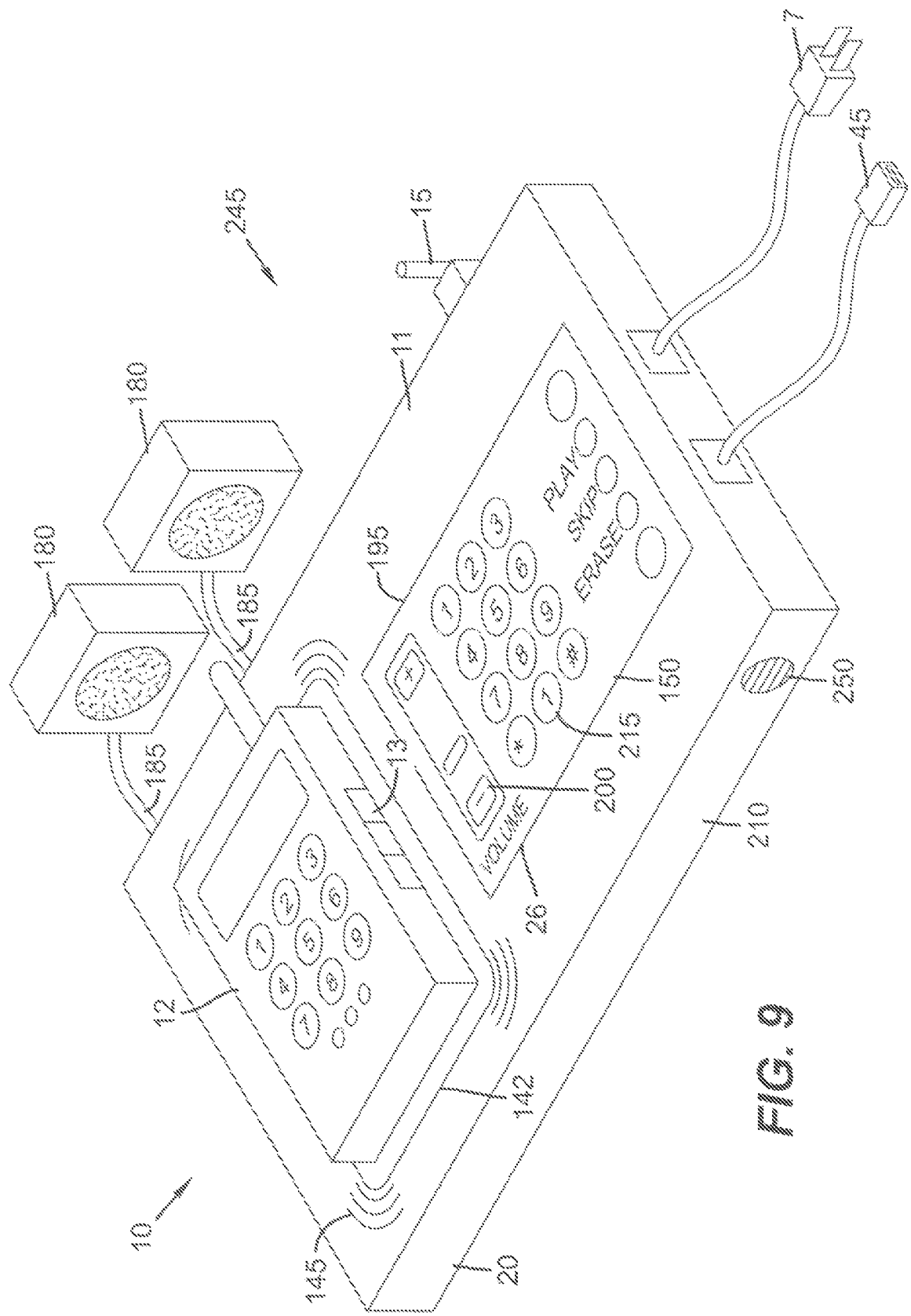
FIG. 9 shows a perspective view of a rechargeable device with a sensing contact user interface based on device location.

FIG. 9 is an embodiment of charging display system 10 having a cordless phone as wirelessly rechargeable device 12. In this embodiment, display menu 155 comprises a designated virtual volume control 200 enabling hands free operation on speakers 180 and a microphone 250. In addition, charging display control system 30 causes sensor system 28 to provide an enlarged user interface that is easy to see. In addition, other interactions illustrated in this embodiment include typical answering machine representations 245, such as charging display system memory 40 (FIGS. 4A, 4B). This too can be used to provide visual feedback and/or visual support for a virtual user input for dialing and retrieving messages, voice recording via microphone 250, wireless communication antenna 15 and data communication cable 45 for land line use.

The invention has been described in detail with particular reference to certain preferred embodiments thereof, but it will be understood that variations and modifications can be effected within the spirit and scope of the invention.

PARTS LIST

| | |
|---|---|
| 5 | power source |
| 7 | power cord |
| 10 | charging display system |
| 11 | contact surface |
| 12 | wirelessly rechargeable device |
| 13 | power receiving element |
| 14 | rechargeable device wireless communication system |
| 15 | wireless communication antenna |
| 16 | rechargeable device power supply |
| 17 | inductive coils |
| 20 | wireless charging system |
| 21 | body |
| 22 | power signal generator circuit |
| 23 | display primary illumination system |
| 24 | wireless charging element |
| 25 | infrared communication port |
| 26 | display |
| 27 | light guide |
| 28 | sensor system |
| 29 | device sensor |
| 29a-i | device sensor |
| 30 | charging display control system |
| 31 | sensor system management circuit |
| 32 | charging display controller |
| 35 | wired connector |
| 37 | rechargeable device controller |
| 38 | rechargeable device memory |
| 40 | charging display system memory |
| 42 | rechargeable device power supply |
| 44 | charging display power supply |
| 45 | data communication cable |
| 46 | rechargeable power source |
| 48 | recharging system |
| 52 | power supply control circuit |
| 53 | path |
| 60 | user control system |
| 90 | additional connector |
| 92 | external data device |
| 94 | wireless communication system |
| 98 | video signal generator |
| 100 | external display device |
| 101 | network interface |
| 102 | audio signal generator |
| 104 | signal processor |
| 110 | other sensors |
| 115 | sensing step |
| 120 | identification step |
| 125 | obtain device representation step |
| 130 | determination step |
| 135 | segmentation step |
| 137 | enable charging step |
| 140 | display graphic information step |
| 142 | wirelessly rechargeable device portion |
| 145 | dynamic charging indication |
| 150 | graphic presentation portion |
| 155 | display menu |
| 160 | charging status indicator |
| 170 | contents display indicator |
| 175 | uploading and downloading indicator |
| 180 | speakers |
| 185 | speaker wires |
| 190 | music player |
| 200 | designated virtual volume control |
| 205 | designated volume control knob |
| 208 | volume graphic indication |
| 210 | virtual power controls |
| 211 | control buttons |
| 215 | graphic information |

-continued

PARTS LIST

| | |
|---|---|
| 220 | designated controls |
| 225 | control assignment graphic |
| 230 | print indicator |
| 235 | data/media representation |
| 240 | printer |
| 245 | answering machine representations |
| 250 | microphone |

The invention claimed is:

1. A method for operating a charging display system, the method comprising the steps of:

sensing the presence of a wirelessly rechargeable device proximate to or on a surface through which a presentation area of a display can present image information;

identifying a type of the wirelessly rechargeable device;

obtaining a device representation having features that are related to a portion of the presentation area that can be occupied by the presence of the identified type of rechargeable device proximate to or on the surface;

determining a position and orientation of the wirelessly rechargeable device proximate to or on the surface;

segmenting the presentation area into a wirelessly rechargeable device portion determined by mapping the obtained device representation at the determined position and orientation and allocating at least part of any remaining available presentation area to be a graphic presentation portion outside of the determined wirelessly rechargeable device portion;

transmitting a wireless power signal through the wirelessly rechargeable device portion to recharge the wirelessly rechargeable device; and displaying graphic information related to the wirelessly rechargeable device in at least a part of the graphic presentation portion.

2. The method of claim 1, further comprising the step of disabling the display within the wirelessly rechargeable device portion.

3. The method of claim 1, wherein the graphic information represents the status of a data interaction or a recharging interaction between the wirelessly rechargeable device and the charging display.

4. The method of claim 1, wherein the graphic information includes an indicia representing a human controllable input and further comprising the steps of sensing a user input action related to the indicia representing a human controllable input and generating an input signal based upon the sensed user input action.

5. The method of claim 4, wherein a particular portion is associated with the human controllable input; wherein the human controllable input is used in controlling charging or data transfer between the wirelessly rechargeable device and the charging display system, and wherein an interaction option is selected from a plurality of available interactions defining interactions between the charging display and the wirelessly rechargeable device or is executed based upon the user input action related to the indicia.

6. The method of claim 4, wherein the sensed user input action comprises contact with a portion of the contact surface in which the indicia representing the user input control is located.

7. The method of claim 1, wherein the graphic information is adapted to fit within the presentation portion.

8. The method of claim 1, further comprising the step of determining a way to charge the wirelessly rechargeable device based upon the determined type.

9. The method of claim 1, wherein the graphic information is determined, at least in part, by a selected one of a plurality of interaction options defining interactions between the charging display and the wirelessly rechargeable device with said interaction options being associated with a physical control on the charging display system and wherein graphic information is determined based upon the interaction option and the determined graphic information is presented proximate to the physical control with which it is associated.

10. A charging display system for use with a rechargeable device having a wireless charging capability and a data exchange capability, the display system comprising:
- a contact surface against which the wirelessly rechargeable device can be positioned;
- a sensor system adapted to sense a type of device, position, and orientation of the wirelessly rechargeable device, to generate a signal from which the type, position, and orientation of the wirelessly rechargeable device can be determined;
- a display presenting graphic information viewable in a presentation area through the contact surface;
- a power signal generator circuit capable of generating a wireless power signal that is adapted to charge the rechargeable device without use of a connector to the rechargeable device;
- a communication system adapted to exchange data with the rechargeable device without use of a connector to the rechargeable device; and
- a display control system adapted to cooperate with the sensor system to determine the type, position, and orientation of the wirelessly rechargeable device proximate to or on the contact surface and to segment the presentation area into a wirelessly rechargeable device portion determined by mapping the obtained device graphical representation at the determined position and orientation and allocating at least part of any remaining available presentation area to a graphic presentation portion outside of the determined rechargeable device portion;
- wherein the display control system further causes the power signal generator circuit to transmit a wireless power signal through a rechargeable device portion and causes the display to present graphic information related to the rechargeable device in at least a part of the graphic presentation portion.

11. The charging display system of claim 10, wherein the contact surface is integrated with the sensor system and is adapted to sense contact with an object.

12. The charging display system of claim 10, wherein the sensor system comprises an optical system that senses deflection of the contact surface by detecting a change in light traveling along a path that is influenced by deflection of the contact surface.

13. The charging display system of claim 10, wherein the wirelessly rechargeable device has a wireless charging capability in the form of a sensing circuit that receives power from an inductive coupling, and wherein said charging circuit comprises an arrangement of inductors that are adapted to provide an electrical field within which the wirelessly rechargeable device can receive power, and wherein said sensing circuit detects which of the inductors is supplying power to the rechargeable device.

14. The charging display system of claim 10, wherein the power signal generator circuit is adapted to generate the power signal in a form that will pass through the display and the surface with no more than a limited level of interference with the function of the display or sensor system.

15. The charging display system of claim 10, wherein said control system is further adapted to generate graphic information having at least one user interface feature that is associated with the determined type of wirelessly rechargeable device.

16. The charging display system of claim 10, wherein the contact surface has device sensors that are integrated with the contact surface to provide a contact sensitive area on a portion of the contact surface that generally corresponds to the displayable area that is viewable through the contact surface.

17. The charging display system of claim 10, wherein the display graphic information includes user interface indicia that is positioned to suggest assignment of one of a plurality of particular functions to individual ones of a plurality of physical user input controls.

18. The charging display system of claim 10, wherein the contact surface and sensor system are further adapted to be responsive to at least a finger or other body part of the user, or a stylus or other sensable interaction element, and wherein the sensor system generates an output signal that indicates when such contact occurs.

19. The charging display system of claim 15, wherein the displayed graphic information is split into several portions in response to enabling text and controls to fit on a screen.

20. The charging display system of claim 13, wherein the charging circuit has first charging technology interspersed with a second, different charging technology.

* * * * *